US007262774B2

(12) United States Patent
Iwata et al.

(10) Patent No.: US 7,262,774 B2

(45) Date of Patent: Aug. 28, 2007

(54) CHARACTER IMAGE GENERATING APPARATUS, CHARACTER IMAGE GENERATING METHOD, DISPLAY CONTROL APPARATUS, DISPLAY CONTROL METHOD AND COMPUTER-READABLE RECORDING MEDIUM RECORDED CHARACTER IMAGE GENERATION PROGRAM OR DISPLAY CONTROL PROGRAM THEREON

(75) Inventors: Satoshi Iwata, Kawasaki (JP); Yoshiyuki Okada, Kawasaki (JP); Masashi Takechi, Hyogo (JP); Hajime Kusaka, Osaka (JP)

(73) Assignees: Fujitsu Limited, Kawasaki (JP); Morisawa & Company Ltd., Osaka (JP)

( * ) Notice: Subject to any disclaimer, the term of this patent is extended or adjusted under 35 U.S.C. 154(b) by 393 days.

(21) Appl. No.: 11/063,843

(22) Filed: Feb. 23, 2005

(65) Prior Publication Data

US 2006/0192781 A1 Aug. 31, 2006

(30) Foreign Application Priority Data

May 17, 2004 (JP) ............................ 2004-146452

(51) Int. Cl.
*G06T 11/00* (2006.01)

(52) U.S. Cl. ...................................... 345/467; 345/468

(58) Field of Classification Search ................. 345/467
See application file for complete search history.

(56) References Cited

U.S. PATENT DOCUMENTS 5,099,435 A * 3/1992 Collins et al. .............. 345/469
5,857,067 A * 1/1999 Hassett et al. ........... 345/469.1
5,959,635 A 9/1999 Watanabe et al. ........... 345/469
6,307,566 B1 * 10/2001 Hill et al. ................... 345/613
6,384,745 B1 5/2002 Azam et al. .................. 341/50
6,501,475 B1 12/2002 Cheng
6,577,253 B2 6/2003 Azam et al. .................. 341/50
6,614,940 B2 9/2003 Azam et al. ................ 382/242
6,738,526 B1 * 5/2004 Betrisey et al. ............. 382/260
7,134,091 B2 * 11/2006 Dresevic et al. ............ 715/771
2004/0008208 A1 1/2004 Dresevic et al.

FOREIGN PATENT DOCUMENTS

EP 1 308 923 5/2003

(Continued)

OTHER PUBLICATIONS

European Patent Office Search Report mailed Jan. 9, 2007 in corresponding European Patent Application No. 05251056.7.

(Continued)

*Primary Examiner*—Kee M. Tung
*Assistant Examiner*—Motilewa Good-Johnson
(74) *Attorney, Agent, or Firm*—Staas & Halsey LLP

(57) ABSTRACT

The present invention relates to a character image generating apparatus. The apparatus comprises a plurality of types of partial base line generating units, a vector font data storing unit, a partial base line length calculating unit for calculating a line length of a partial base line of a character, a partial base line generating unit selecting unit for selecting one of the plurality of types of partial base line generating units on the basis of threshold information and the calculated partial base line length, a character form generating unit for generating a character form of the character image, and a character image generating unit for generating the character image on the basis of the generated character form. This can shorten the processing time needed for the generation of the vector font character image.

20 Claims, 20 Drawing Sheets

FOREIGN PATENT DOCUMENTS

| | | |
|---|---|---|
| JP | 5-188911 | 7/1993 |
| JP | 9-106272 | 4/1997 |
| JP | 2000-322586 | 11/2000 |
| WO | 2004/006166 | 1/2004 |

OTHER PUBLICATIONS

J. D. Foley, et al., "Computer Graphics: Principles and Practice" (Second Edition in C), Ohmsha, Mar. 2001, pp. 488-490.

H. Okumura et al., "Dictionary of Algorithm Based on JAVA", Gijutsuhyoronsha, Jun. 2003, pp. 146-150.

S. Kubota, "Ecology of Liquid Crystal Display View Point to Display Technology Centering Users", Human Science Fronteer Series-2000, Labor Science Laboratory Publisher, Mar. 1998, pp. 116-125.

S. Kubota, "Effects of Character Size, Character Format, and Pixel Density on Subjective Legibility of Reflective Liquid Crystal Displays for Personal Digital Assistants", Research News Flash, Image Information Media Society Magazine, vol. 55, No. 10, Jan. 2001, pp. 1363-1366.

K. T. Spoehr, et al., "Visual Information Processing, Software on <Seeing>", Science Corporation, Dec. 1986, pp. 36-37.

* cited by examiner

FIG. 5

| TYPEFACE NAME | THRESHOLD SETTING INFORMATION |
|---|---|
| GOTHIC | 0.5 mm |
| ROUNDED GOTHIC | 0.5 mm |
| MINCHO | 0.4 mm |
| TEXTBOOK | 0.4 mm |
| : | : |

FIG. 6

| NUMBER OF STROKES OF CHARACTER | THRESHOLD SETTING INFORMATION |
|---|---|
| BELOW 10 | 0.3 mm |
| BELOW 15 | 0.4 mm |
| BELOW 20 | 0.5 mm |

BEZIER APPROXIMATE CURVE

ANALYSIS ON
NUMBER OF DOTS

SELECTION OF LINEARITY

FIG. 12

| TYPEFACE NAME | THRESHOLD SETTING INFORMATION 2 (CONTROL POINT THINNING) | THRESHOLD SETTING INFORMATION 1 (LINEAR APPROXIMATION) |
|---|---|---|
| GOTHIC | 0.75mm | 0.5 mm |
| ROUNDED GOTHIC | 0.75mm | 0.5 mm |
| MINCHO | 0.6mm | 0.4 mm |
| TEXTBOOK | 0.6mm | 0.4 mm |
| : | : | : |

DOT FONT

OUTLINE FONT

CHARACTER IMAGE GENERATING APPARATUS, CHARACTER IMAGE GENERATING METHOD, DISPLAY CONTROL APPARATUS, DISPLAY CONTROL METHOD AND COMPUTER-READABLE RECORDING MEDIUM RECORDED CHARACTER IMAGE GENERATION PROGRAM OR DISPLAY CONTROL PROGRAM THEREON

BACKGROUND OF THE INVENTION (1) Field of the Invention

The present invention relates to a technique of displaying a character image of a vector font on a display unit.

(2) Description of the Related Art

In general, a portable type information processing apparatus such as portable telephone or PDA (Personal Digital Assistant) employs dot fonts for the display of characters because of a low throughput or graphic throughput of a CPU (Central Processing Unit).

FIG. 19 is an illustration of an example of a dot font. The dot font is for expressing a character image as information on the presence or absence of dots, and the display of a character image is feasible without conducting complicated arithmetic operations only by developing the dot font, stored in a memory or the like in advance, on a screen and, hence, the dot font is an efficient means for use in the portable type information processing apparatus having a low throughput as mentioned above. However, as shown in FIG. 19, the character expression based on a binary image of a dot font cannot provide a character image with a high-quality design.

Meanwhile, the "Effects of Character Size, Character Format, Pixel Density on Subjective Legibility of Reflective Liquid Crystal Displays for Personal Digital Assistants" (written by Satoru Kubota; Image Information Media Academic Journal, Vol. 55, No. 10, pp. 1363-1366, 2001. 10) says that a character of approximately 3.5 mm is clearly visible on a liquid crystal screen.

For example, in general, the display resolution of a liquid crystal panel for use in a portable telephone is approximately 140 dpi (dot per inch), and in a case in which a character of approximately 3.5 mm is displayed on this liquid crystal panel with approximately 140 dpi, the pixels constituting one character are approximately 20 dots×20 dots. Moreover, the number of strokes (number of edges) of a Japanese character becomes approximately 10 to 12 in the case of a larger number of strokes. Accordingly, when a complicated character having many strokes is displayed on a liquid crystal panel of a portable telephone, there is a need to deform the character itself, such as omitting a portion of the character.

Recently, a liquid crystal panel having a display resolution exceeding 180 dpi has been employed for built-in equipment such as a portable type information processing apparatus, and a portable type information processing apparatus has appeared which has a throughout (level equal to PC approximately 10 years ago) capable of operating a graphic library. Moreover, also for portable telephones, there has been an increased need for a high-quality design.

On the other hand, in the case of a dot font, since a fine font having a large number of dots requires a large volume of data, the character image capacity increases along with the trend to higher definition of a display screen of a portable type information processing apparatus, which creates a problem of the shortage of storage capacity needed for font data.

Meanwhile, as a common method for the faithful reproduction of a character design, curves constituting a character are converted into data and the character form is reproduced in accordance with a character size to be supplied. The outline font is one example of this method. There is an increased need to mount this outline font in a built-in equipment. FIG. 20 is an illustration of an example of an outline font.

Referring to a flow chart (steps A10 to A50) of FIG. 21, a description will be given hereinbelow of a character image production process based on an outline font.

First of all, outline data such as font data, UNICODE and curve data are read out from a font memory or the like (step A10), and an outline is produced on the basis of this outline data (step A20). Moreover, anti-aliasing area is produced on the basis of the produced outline (step A30), then writing the outline (reproduction of a character outline) (step A40). Still moreover, a portion inside the outline is painted out (step A50) so as to create a character image.

The outline font outline is converted into data as straight lines and approximate curves. Moreover, as the typical approximate curves, there are the Bezier curve and the spline curve. For example, in the case of the character image generation using the Bezier curve, the starting point, the end point and control points for the interpolation therebetween are used as data and, after a closed curve is obtained on the basis of these points, the internal portion of the closed curve is painted out to generate a character image. That is, in the case of the outline font, a character outline is generated on the basis of some control point information.

FIG. 22 is an illustration of a functional expression on the Bezier curve. In general, the Bezier curve is a curve to be used for the PostScript or the like, and the Bezier function to be used for this Bezier curve is a function representing a tertiary approximate curve. When the starting point of a curve, the end point thereof and two control points thereof are taken as $(x_1, y_1)$, $(x_4, y_4)$ and $(x_2, y_2)$, $(x_3, y_3)$, respectively, as shown in FIG. 22, the Bezier curve is expressed by the following equations (1) and (2).

$$x=(1-t)^3x_1+3(1-t)^2tx_2+3(1-t)t^2x_3+t^3x_4 \tag{1}$$

$$y=(1-t)^3y_1+3(1-t)^2ty_2+3(1-t)t^2y_3+t^3y_4 \tag{2}$$

where $0\leqq t\leqq 1$

FIG. 23 is an illustration of a functional expression on the spline curve. In general, the spline curve is an approximate curve to be used for the True Type font or the like, and the spline function to be used for this spline curve is a function representing a secondary approximate curve. When the starting point of a curve, the end point thereof and the control point thereof are taken as $(x_1, y_1)$, $(x_3, y_3)$ and $(x_2, y_2)$, respectively, as shown in FIG. 23, the spline curve is expressed by the following equations (3) and (4).

$$x=(1-t)^2x_1+2t(1-t)x_2+tx_3 \tag{3}$$

$$y=(1-t)^2y_1+2t(1-t)y_2+ty_3 \tag{4}$$

where $0\leqq t\leqq 1$

Incidentally, as a font for forming a character image according to a method similar to the outline font mentioned above, there is the stroke font expressing a glyph configuration by a vector of a skeleton line of image lines thereof.

This stroke font is for producing a character image, for example, by retaining a center line of a character and thickening this center line.

[Non-Patent Document 1] written by Satoru Kubota "Effects of Character Size, Character Format, Pixel Density on Subjective Legibility of Reflective Liquid Crystal Displays for Personal Digital Assistants" (Image Information Media Academic Journal, Vol. 55, No. 10, pp. 1363-1366, 2001. 10)

In general, for carrying out the character display in an information processing apparatus, it is desirable that the processing from the generation of a character image to the display on a display unit is conducted within a time shorter than a time (approximately 0.2 seconds) which is detectable by the human being.

However, a conventional outline font generation method requires the calculation processing of a quadratic or cubic equation even in a case in which the generation of a border line (outline) is made through the use of any one of the Bezier curve or the spline curve, which requires much time for the outline generation processing. In particular, since a portable type information processing apparatus such as portable telephone has a low throughput, the outline generation processing takes a long time to display a character image based on the outline font.

Thus, in the outline font generation process, it is desirable to conduct the outline generation processing, which requires time particularly, within a short time.

SUMMARY OF THE INVENTION

The present invention has been developed in consideration of these problems, and it is therefore an object of the invention to shorten the processing time needed for the generation of a character image based on a vector font.

For this purpose, in accordance with an aspect of the present invention, there is provided a character image generating apparatus, which generates a character image to be displayed on a display unit on the basis of a vector font for generating the character image through the use of a character form baseline formed by combining a plurality of linear elements, comprising a plurality of types of partial base line generating means each for generating a partial base line corresponding to each of the linear elements of the character form base line, a vector font data storing unit for storing vector font data to be used for the generation of the character image, a partial base line length calculating unit for calculating a line length of the partial base line of a character which is an object of display on the basis of the vector font data stored in the vector font data storing unit, a partial base line generating means selecting unit for selecting one of the plurality of types of partial base line generating means on the basis of threshold information set on the basis of a display performance of the display unit and a vision characteristic of the human being and the partial base line length calculated in the partial base line length calculating unit, a character form generating unit for generating the partial base line corresponding to each of the plurality of linear elements constituting the character form base line through the use of the partial base line generating means selected by the partial base line generating means selecting unit for generating a character form of the character image, and a character image generating unit for generating the character image on the basis of the character form generated by the character form generating unit.

In this connection, it is also appropriate that the character image generating apparatus further comprises a display unit information storing unit for storing display unit information as the display performance of the display unit, a threshold setting information storing unit for storing threshold setting information indicative of a linear element length invisible in variation of curvature to the human being as the threshold information, and a threshold calculating unit for calculating a threshold on the basis of the display unit information stored in the display unit information storing unit and the threshold setting information stored in the threshold setting information storing unit, with the partial base line generating means selecting unit being made to select the one of the plurality of types of partial base line generating means on the basis of the threshold calculated by the threshold calculating unit and the partial base line length calculated by the partial base line length calculating unit.

In addition, it is also appropriate that the character image generating apparatus further comprises a display resolution calculating unit for, when the display unit information is a display screen size of the display unit and the number of pixels thereof, calculating a display resolution of the display unit on the basis of the display screen size and the number of pixels.

Still additionally, it is also appropriate that the character image generating apparatus further comprises a threshold information storing unit for storing the threshold information in a state associated with the display performance of the display unit, with the threshold information being previously calculated on the basis of the display performance of the display unit and a linear element length invisible in variation of curvature to the human being, and the partial base line generating means selecting unit selecting the one of the plurality of types of partial base line generating means on the basis of the threshold information stored in the threshold information storing unit and the partial base line length.

Yet additionally, it is also appropriate that at least one of the plurality of types of partial base line generating means is linear approximation calculation means for carrying out linear approximation on a linear element of a curve.

Moreover, it is also appropriate that at least one of the plurality of types of partial base line generating means is curvilinear approximation calculating means for carrying out curvilinear approximation on a linear element of a curve.

Still moreover, it is also appropriate that the plurality of types of partial base line generating means have a plurality of types of curvilinear approximation calculation means different in degree from each other, and the partial base line generating means selecting unit selects a curvilinear approximation calculation means having a lower degree.

Yet moreover, it is also appropriate that a plurality of types of pattern images of the partial base lines corresponding to the linear elements are prepared in association with a starting position of the linear element, an end position thereof and a control point position thereof, and one of the plurality of types of partial base line generating means is pattern image replacing means which uses the pattern image as the partial base line and the character form generating unit generates the partial base line corresponding to the linear element constituting the character form base line through the use of the pattern image equal in starting position and end position and approximate in control point position to the linear element.

In addition, it is also appropriate that the vector font is an outline font and the character form base line is an outline of the character image.

Still additionally, it is also appropriate that the vector font is a stroke font and the character form base line is a skeleton line of the character image.

Furthermore, in accordance with a further aspect of the present invention, there is provided a character image generating method of generating a character image to be displayed on a display unit on the basis of a vector font for generating the character image through the use of a character form base line formed by combining a plurality of linear elements, comprising a partial base line length calculating step of calculating a line length of the partial base line of a character which is an object of display on the basis of vector font data for generating the character image, a partial base line generating means selecting step of selecting one of a plurality of types of partial base line generating means for generating a partial base line corresponding to each of the linear elements of the character form base line on the basis of threshold information set on the basis of a display performance of the display unit and a vision characteristic of the human being and the partial base line length calculated in the partial base line length calculating step, a character form generating step of generating the partial base line corresponding to each of the plurality of linear elements constituting the character form base line through the use of the partial base line generating means selected in the partial base line generating means selecting step for generating a character form of the character image, and a character image generating step of generating the character image on the basis of the character form generated in the character form generating step.

In this connection, it is also appropriate that the character image generating apparatus further comprises a threshold calculating step of calculating a threshold on the basis of display unit information on a display resolution of the display unit as the display performance of the display unit and threshold setting information indicative of a linear element length invisible in variation of curvature to the human being as the threshold information, in the partial base line generating means selecting step, one of the plurality of types of partial base line generating means being selected on the basis of the threshold calculated in the threshold calculating step and the partial base line length calculated in the partial base line length calculating step.

In addition, it is also appropriate that the character image generating method further comprises a display resolution calculating step of, when the display unit information is a display screen size of the display unit and the number of pixels thereof, calculating a display resolution of the display unit on the basis of the display screen size and the number of pixels.

Still additionally, it is also appropriate that the character image generating method further comprises a threshold information storing step of storing the threshold information in a state associated with the display performance of the display unit, with the threshold information being previously calculated on the basis of the display performance of the display unit and a linear element length invisible in variation of curvature to the human being, and in the partial base line generating means selecting step, one of the plurality of types of partial base line generating means is selected on the basis of the threshold information stored in the threshold information storing step and the partial base line length.

Furthermore, in accordance with a further aspect of the present invention, there is provided a display control apparatus, which controls the display of a character image on a display unit on the basis of a vector font for generating the character image through the use of a character form baseline formed by combining a plurality of linear elements, comprising a plurality of types of partial basic line generating means each for generating partial base lines corresponding to the linear elements of the character form base line, a vector font data storing unit for storing vector font data to be used for the generation of the character image, a partial base line length calculating unit for calculating a line length of the partial base line of a character which is an object of display on the basis of the vector font data stored in the vector font data storing unit, a partial base line generating means selecting unit for selecting one of the plurality of types of partial base line generating means on the basis of threshold information set on the basis of a display performance of the display unit and a vision characteristic of the human being and the partial base line length calculated in the partial base line length calculating unit, a character form generating unit for generating the partial base line corresponding to the linear element through the use of the partial base line generating means selected by the partial base line generating means selecting unit for generating a character form of the character image, a character image generating unit for generating the character image on the basis of the character form generated by the character form generating unit, and a display control unit for carrying out control so that the character image generated by the character image generating unit is displayed on the display unit.

Still furthermore, in accordance with a further aspect of the present invention, there is provided a display control apparatus, which controls the display of a character image on a display unit on the basis of a vector font for generating the character image through the use of a character form base line formed by combining a plurality of linear elements, comprising a plurality of types of partial basic line generating means each for generating partial base lines corresponding to the linear elements of the character form base line, a vector font data storing unit for storing vector font data to be used for the generation of the character image, a partial base line length calculating unit for calculating a line length of the partial base line of a character which is an object of display on the basis of the vector font data stored in the vector font data storing unit, a partial base line generating means selecting unit for selecting one of the plurality of types of partial base line generating means on the basis of threshold information set on the basis of a display performance of the display unit and a vision characteristic of the human being and the partial base line length calculated in the partial base line length calculating unit, a character form generating unit for generating the partial base line corresponding to each of the plurality of linear elements constituting the character form base line through the use of the partial base line generating means selected by the partial base line generating means selecting unit for generating a character form of the character image, a character image generating unit for generating the character image on the basis of the character form generated by the character form generating unit, and a display control unit for carrying out control so that the character image generated by the character image generating unit is displayed on the display unit.

Yet furthermore, in accordance with a further aspect of the present invention, there is provided a display control method of controlling the display of a character image on a display unit on the basis of a vector font for generating the character image through the use of a character form base line formed by combining a plurality of linear elements, comprising a vector font data storing step of storing vector font data to be used for the generation of the character image, a partial base line length calculating step of calculating a line length of the partial base line of a character which is an object of display on the basis of the vector font data stored in the vector font data storing step, a partial base line generating means selecting step of selecting one of a plurality of types of partial base line generating means, each made to generate a partial base line corresponding to each of the linear elements of the character form base line, on the basis of threshold information set on the basis of a display performance of the display unit and a vision characteristic of the human being and the partial base line length calculated in the partial base line length calculating step, a character form generating step of generating the partial base line corresponding to each of the plurality of linear elements constituting the character form base line through the use of the partial base line generating means selected by the partial base line generating means selecting step for generating a character form of the character image, a character image generating step of generating the character image on the basis of the character form generated in the character form generating step, and a display control step of carrying out control so that the character image generated in the character image generating step is displayed on the display unit.

In addition, in accordance with a further aspect of the present invention, there is provided a character image generating program which makes a computer carry out a character image generation function to generate a character image to be displayed on a display unit on the basis of a vector font for generating the character image through the use of a character form base line formed by combining a plurality of linear elements, and which makes the computer carry out a partial base line length calculating step of calculating a line length of the partial base line of a character which is an object of display on the basis of vector font data for generating the character image, a partial base line generating means selecting step of selecting one of a plurality of types of partial base line generating means for generating a partial base line corresponding to each of the linear elements of the character form base line on the basis of threshold information set on the basis of a display performance of the display unit and a vision characteristic of the human being and the partial base line length calculated in the partial base line length calculating step, a character form generating step of generating the partial base line corresponding to each of the plurality of linear elements constituting the character form base line through the use of the partial base line generating means selected in the partial base line generating means selecting step for generating a character form of the character image, and a character image generating step of generating the character image on the basis of the character form generated in the character form generating step.

Still additionally, in accordance with a further aspect of the present invention, there is provided a computer-readable recording medium recording a character image generating program which makes a computer carry out a character image generation function to generate a character image to be displayed on a display unit on the basis of a vector font for generating the character image through the use of a character form base line formed by combining a plurality of linear elements, the character image generating program making the computer carry out a partial base line length calculating step of calculating a line length of the partial base line of a character which is an object of display on the basis of vector font data for generating the character image, a partial base line generating means selecting step of selecting one of a plurality of types of partial base line generating means for generating a partial base line corresponding to each of the linear elements of the character form base line on the basis of threshold information set on the basis of a display performance of the display unit and a vision characteristic of the human being and the partial base line length calculated in the partial base line length calculating step, a character form generating step of generating the partial base line corresponding to each of the plurality of linear elements constituting the character form base line through the use of the partial base line generating means selected in the partial base line generating means selecting step for generating a character form of the character image, and a character image generating step of generating the character image on the basis of the character form generated in the character form generating step.

Yet additionally, in accordance with a further aspect of the present invention, there is provided a display control program which makes a computer carry out a display control function to control the display of a character image on a display unit on the basis of a vector font for generating the character image through the use of a character form base line formed by combining a plurality of linear elements, the display control program making the computer carry out a vector font data storing step of storing vector font data to be used for the generation of the character image, a partial base line length calculating step of calculating a line length of the partial base line of a character which is an object of display on the basis of the vector font data stored in the vector font data storing step, a partial base line generating means selecting step of selecting one of a plurality of types of partial base line generating means, each made to generate a partial base line corresponding to each of the linear elements of the character form base line, on the basis of threshold information set on the basis of a display performance of the display unit and a vision characteristic of the human being and the partial base line length calculated in the partial base line length calculating step, a character form generating step of generating the partial base line corresponding to each of the plurality of linear elements constituting the character form base line through the use of the partial base line generating means selected by the partial base line generating means selecting step for generating a character form of the character image, a character image generating step of generating the character image on the basis of the character form generated in the character form generating step, and a display control step of carrying out control so that the character image generated in the character image generating step is displayed on the display unit.

Moreover, in accordance with a further aspect of the present invention, there is provided a computer-readable recording medium recording a display control program which makes a computer carry out a display control function to control the display of a character image on a display unit on the basis of a vector font for generating the character image through the use of a character form base line formed by combining a plurality of linear elements, the display control program making the computer carry out a vector font data storing step of storing vector font data to be used for the generation of the character image, a partial base line length calculating step of calculating a line length of the partial base line of a character which is an object of display on the basis of the vector font data stored in the vector font data storing step, a partial base line generating means selecting step of selecting one of a plurality of types of partial base line generating means, each made to generate a partial base line corresponding to each of the linear elements of the character form base line, on the basis of threshold information set on the basis of a display performance of the display unit and a vision characteristic of the human being and the partial base line length calculated in the partial base line length calculating step, a character form generating step of generating the partial base line corresponding to each of the plurality of linear elements constituting the character form base line through the use of the partial base line generating means selected by the partial base line generating means selecting step for generating a character form of the character image, a character image generating step of generating the character image on the basis of the character form generated in the character form generating step, and a display control step of carrying out control so that the character image generated in the character image generating step is displayed on the display unit.

As described above in detail, the present invention can provide the following effects and advantages. That is, (1) the present invention can shorten the processing time to be taken for the generation of a character form based on a vector font;

(2) it can improve the quality of a character image to be displayed on a display unit; and (3) it can enhance the applicability to a display unit and further provide high convenience and economical efficiency.

BRIEF DESCRIPTION OF THE DRAWINGS

FIG. 5 is an illustration of an example of threshold setting information to be used in the display system according to the first embodiment of the present invention;

FIG. 6 is an illustration of an example of threshold setting information to be used in the display system according to the first embodiment of the present invention;

FIG. 12 is an illustration of an example of threshold setting information to be used in a display system according to a second embodiment of the present invention;

DESCRIPTION OF THE PREFERRED EMBODIMENTS

Embodiments of the present invention will be described hereinbelow with reference to the drawings.

(A) Description of First Embodiment

Figure 1:
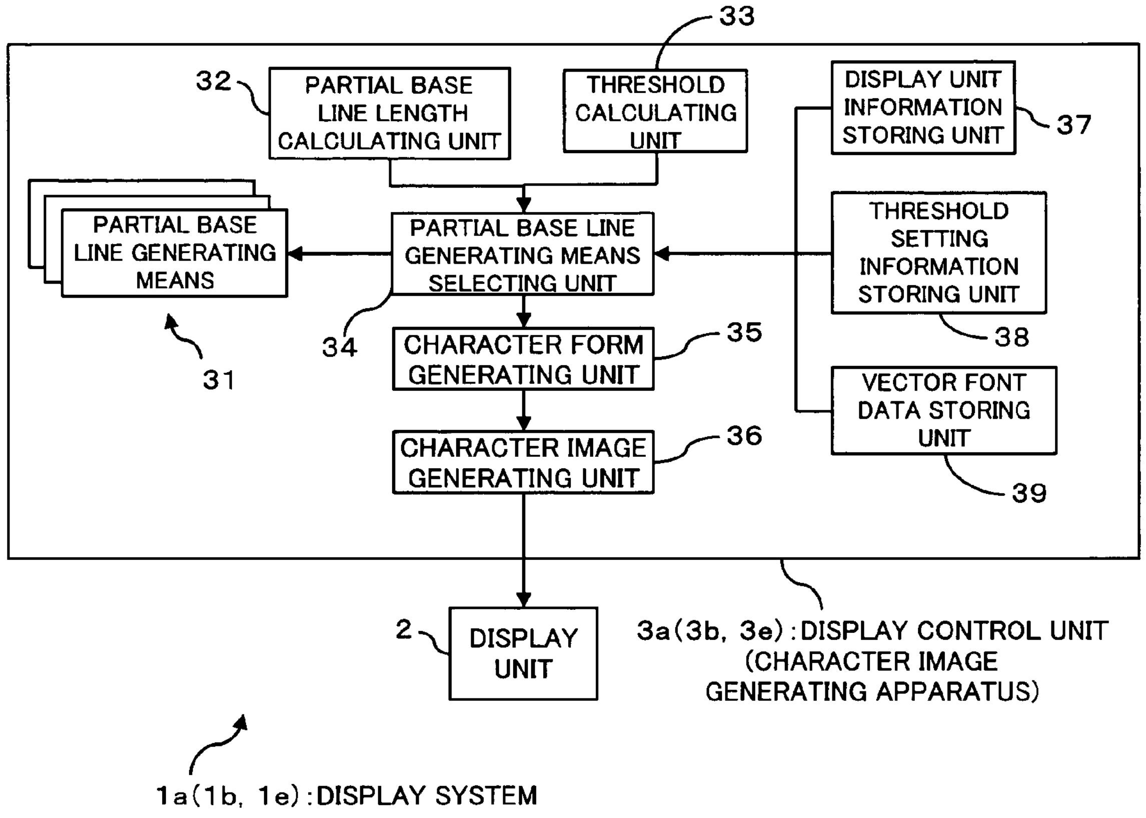
FIG. 1 is a block diagram showing a functional configuration of a display system according to a first embodiment of the present invention.
Figure 2:
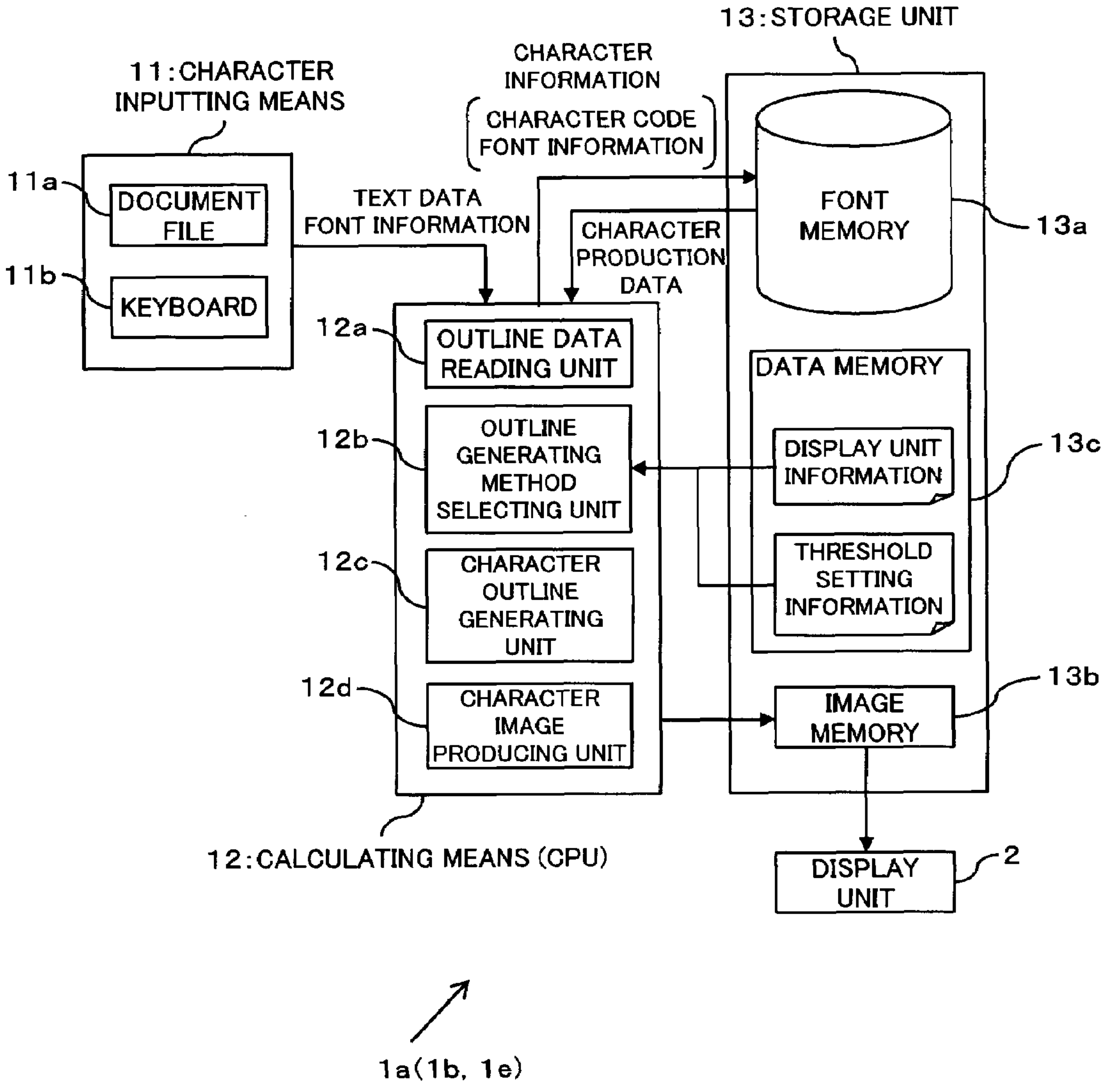
FIG. 2 is a block diagram showing a hardware configuration of the display system according to the first embodiment of the present invention.

FIGS. 1 and 2 are illustrations of a display system according to a first embodiment of the present invention. FIG. 1 is a block diagram showing a functional configuration of the display system according to the first embodiment of the present invention and FIG. 2 is a block diagram showing a hardware configuration thereof.

A display system, generally designated at numeral 1*a*, according to the first embodiment is provided, for example, in an information processing apparatus such as a portable telephone or PDA (Personal Digital Assistant) and is made up of a display unit 2 and a display control unit (display control apparatus) 3*a* as shown in FIG. 1. This display system 1*a* is made to display a character image (glyph) based on a vector font on the display unit 2. In this first embodiment, as an example, a character image is displayed through the use of an outline font as the vector font.

A font formed using outline data is referred to as an "outline font" and, in this specification, it is different from a stroke font formed using reproduction data on individual curves constituting a skeleton line (character center line or the like).

The display unit 2 is for displaying a character image or the like which is an object of display and, for example, it is realized with a color liquid crystal display.

The display control unit (character image generating unit) 3*a* is made to generate a character image and carry out display control therefor when the character image is displayed on the aforesaid display unit 2 and, as shown in FIG. 1, it is made up of partial base line generating means 31, a partial base line length calculating unit 32, a threshold calculating unit 33, a partial base line generating means selecting unit 34, a character form generating unit 35, a character image generating unit 36, a display unit information storing unit 37, a threshold setting information storing unit 38 and a vector font data storing unit 39.

The vector font data storing unit 39 is for storing information (vector font data) for the formation of a character image based on a vector font and, in this first embodiment, it is made to store outline data (character generation data) for the generation of an outline font.

Figure 3A:
FIGS. 3A and 3B are illustrations useful for explaining an outline font.
Figure 3B:
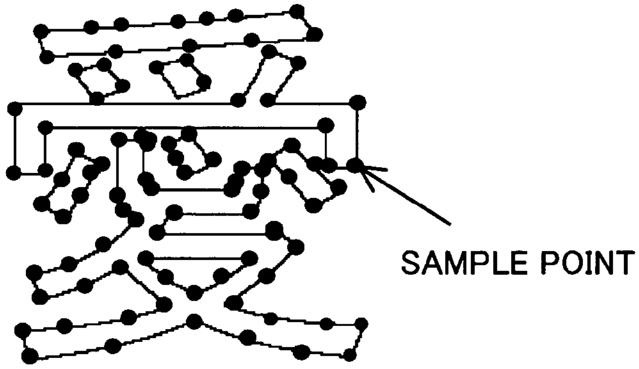

FIGS. 3A and 3B are illustrations for explaining an outline font. FIG. 3A is an illustration of an example of a character expressed by an outline font, and FIG. 3B is an illustration of an outline (border line; character form base line) of the character shown in FIG. 3A. The outline is for specifying a character image and is formed by interlinking a plurality of linear elements (partial base lines, individual curves). In FIG. 3B, black points depict end points (sample points) of linear elements.

The vector font data storing unit 39 is made to store a starting point position (starting point coordinate), endpoint position (endpoint coordinate) and control point position (control point coordinate) of each of the linear elements. For example, in a case in which the Bezier curve expressed by the aforesaid equations (1) and (2) is used as the curve data, when a starting point of a curve, an end point thereof and two control points thereof are taken as $(x_1, y_1)$, $(X_4, y_4)$ and $(x_2, y_2)$, $(x_3, y_3)$, the respective coordinate values $x_1$, $x_2$, $x_3$, $x_4$, $y_1$, $y_2$, $y_3$ and $y_4$ are stored as the outline data.

Moreover, the character image shown in FIG. 3A is produced by painting out the inner portion of the outline shown in FIG. 3B.

The partial base line generating means 31 provides a method (outline generating method) of generating an image of a linear element and particularly provides a method of making an approximate curve generation (curvilinear approximation calculation means) with respect to a linear element of a curve through the use of, for example, the Bezier curve (curvilinear approximation function) or the spline curve (curvilinear approximation function) or a method of generating an outline (partial outline; partial base line) corresponding to the linear element through the use of a linear approximation. The linear approximation method is for carrying out the linear approximation between a starting point of a linear element and an end point thereof by making a connection between the starting point and the end point, and it will be described later in detail.

Furthermore, this display system 1*a* is equipped with a plurality of types of partial base line generating means 31, and a partial outline corresponding to the linear element is generated according to a technique selected from these plurality of types of partial base line generating means 31.

The display unit information storing unit 37 is for storing information (display unit information, display performance) on a display resolution of the display unit 2 and, for example, it is made to store a numerical value (unit; dpi (dot per inch)) indicative of the display resolution or the reverse number thereof. In this display system 1*a*, in the case of the employment of a plurality of types of display units 2, it is preferable that the display unit information on each of the plurality of display units 2 is preserved in a state associated with the information (product number or the like) for specifying this display unit 2.

The threshold setting information storing unit 38 is for storing threshold setting information indicative of a linear element length invisible in variation of curvature to the human being.

Figure 4:
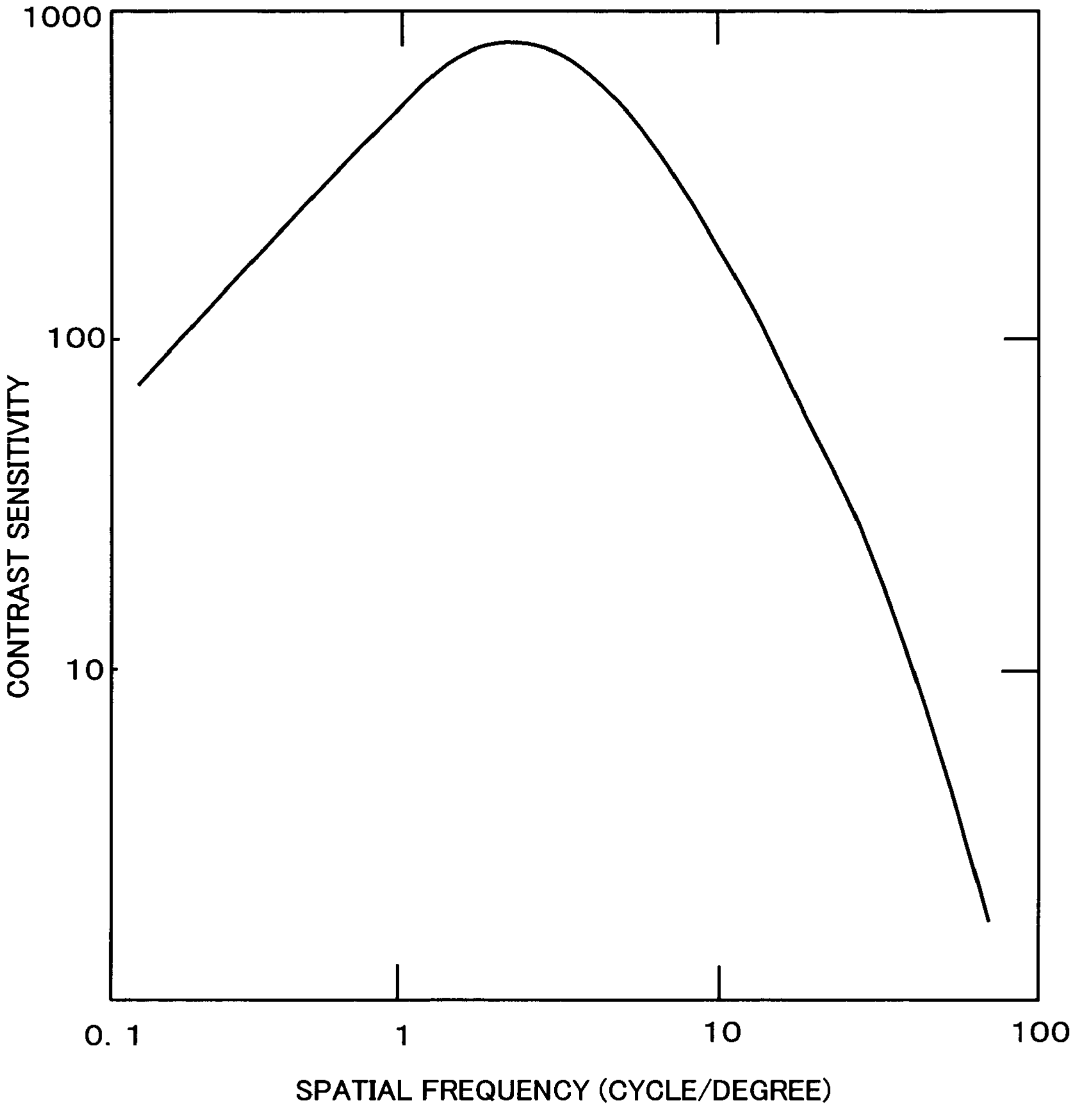
FIG. 4 is an illustration of the relationship between a contrast sensitivity and a spatial frequency.

FIG. 4 is an illustration (extracted from K. T Spoehr, S. W. Lehmkuhle "Vision Information Processing") of the relationship between contrast sensitivity and spatial frequency).

In general, a display panel (display unit 2) to be mounted in portable equipment such as portable telephone or PDA is almost constant because of the requirements for the portability. On the other hand, with respect to the character size, a readable size (approximately 3.5 mm) exists, and a change of size to be used takes place in a given range close thereto. Therefore, if the display resolution of the display panel is found, the number of pixels organizing a character to be used in portable equipment can be determined uniquely.

For example, in a case in which a character with a size of 3 mm to 4 mm is displayed on a liquid crystal display panel of 200 dpi, the character image is formed with 24×24 to 36×36 dots. Moreover, the longest one of linear elements constituting an outline is approximately 90% of the number of dots, and most of the existing linear elements are expressed with several dots.

In the case of employing an approximate curve such as Bezier with respect to linear elements whose linear element length is below several dots, even if the control point coordinate is set at maximum within a character coordinate system, the variation in curvature of the linear element does not show a large difference in comparison with a straight line (referring to FIG. 4 and "Vision Information processing <Software on Seeing> written by Kathryn T. Spoeher, Stephen W. Lehmkuhle, and translated by Naoyuki Imosaka, Sciences Co., Ltd., 1986").

Accordingly, when a linear element (curve) with a size (below several dots) set in advance is expressed by carrying out the linear (straightening) approximation on the starting point and end point of this linear element, the difference (variation of curvature) therebetween is unrecognizable through the visual sensation of the human being. For this reason, the linear approximation on an linear element of a curve becomes feasible without showing a visual difference to the human being. In the present invention, as mentioned above, in a display panel, the linear approximation is made with respect to an approximate curve by utilizing the human's visual characteristic that a variation below several dots is hard to recognize.

In the threshold setting information, a size is set so that a variation in curvature of a character outline is hard to recognize by means of a resolution of an eye of the human being. Concretely, a linear element size (for example, 0.4 to 0.6 mm) which makes it difficult to distinguish between a straight line and a curve is set on the basis of the fact that an angle of view of approximately 2 or 3 minutes is hard to recognize through an eye of the human being. Incidentally, although the character quality becomes higher as the threshold is shortened, the processing speed for the display of that linear element becomes lower.

FIGS. 5 and 6 are illustration of an example of threshold setting information to be used for the display system 1*a* according to this first embodiment. FIG. 5 shows an example (threshold setting table) in which threshold setting information is set in the form of a table for each font type (typeface). For example, in the case of a typeface such as Gothic including many linear elements each high in linearity, a less variation in linear element curvature occurs and, hence, in the example shown in FIG. 5, the threshold setting information is set at 0.5 mm, and in the case of a typeface (textbook style or the like) in which the stroke tends to be a curve, the threshold setting information is set at 0.4 mm.

In a case in which a character image based on an outline font such as Gothic is generated on the basis of the threshold setting table shown in FIG. 5, for the production of an outline of a linear element, the linear approximation is made if the linear element length of the individual linear element is below 0.5 mm, while the original approximate curve (in this embodiment, for example, Bezier curve) is used if the linear element length is equal to or more than 0.5 mm.

When a threshold is set for each font type in this way, the threshold setting is automatically made by changing the font type through the use of a character inputting means 11 or the like, thereby enabling a character display of the outline font to be made in an optimum condition.

FIG. 6 is an illustration of an example (threshold setting table) in which the threshold setting information is set in the form of a table for each stroke count. In general, the number of linear elements decreases as the number of strokes in a character increases, and the number of linear elements increases as the number of strokes in a character decreases. Since the frequency of use of a long curve decreases with an increase in number of linear elements, it is also effective that the threshold setting information is set in corresponding relation to a stroke count of a character as shown in FIG. 6.

The threshold calculating unit 33 is made to calculate a threshold corresponding to each font or character stroke count on the basis of display unit information stored in the display unit information storing unit 37 and threshold setting information stored in the threshold setting information storing unit 38. Concretely, when the threshold setting information is taken as L (unit; mm) and the display resolution of the display unit 2 is taken as D (unit; dpi), a threshold T (unit; dot) is calculated according to the following equation (5).

$$T=L\div(25.4/D) \quad (5)$$

The partial baseline length calculating unit 32 is made to calculate a length (linear element length) of a linear element on the basis of outline data stored in the vector font data storing unit 39. For example, $|x_1-x_4|$ (the absolute value of the difference between $x_1$ and $x_4$) and $|y_1-y_4|$ (the absolute value of the difference between $y_1$ and $y_4$) are calculated on the basis of the starting point coordinate $(x_1, y_1)$ of a linear element and the end point coordinate $(x_4, y_4)$ thereof and the larger one is used as the linear element length. Moreover, this partial base line length calculating unit 32 is made to convert the calculated linear element into the number of dots through the use of the above-mentioned equation (5). That is, the partial base line length calculating unit 32 calculates the number of dots of that linear element on the basis of the positions of the starting point, end point and control point of the linear element.

The partial base line generating means selecting unit 34 is made to select one partial base line generating means from a plurality of types of partial base line generating means 31 on the basis of a threshold calculated by the threshold calculating unit 33 and a linear element length calculated by the partial base line length calculating unit 32. Concretely, the partial base line generating means selecting unit 34 sees, for example, the threshold setting table shown in FIG. 5 or 6 and, when the linear element length (number of dots) calculated by the partial base line length calculating unit 32 is smaller than the threshold (number of dots) calculated by the threshold calculating unit 33, selects a linear approximation method as the partial base line generating means and, when the linear element length calculated by the partial base line length calculating unit 32 exceeds the threshold calculated by the threshold calculating unit 33, selects, as the partial base line generating means, an approximate curve generating method employing a functional curve (for example, the Bezier curve) used as outline data stored in the vector font data storing unit 39 in advance.

The character form generating unit 35 is made to, with respect to each of a plurality of linear elements constituting an outline, generate an image of a partial outline (partial base line) corresponding to this linear element through the use of the partial base line generating means selected by the partial base line generating means selecting unit 34, and form an image of each of the partial outlines of all the linear elements constituting an outline of the character (a character which is an object of display), thereby generating the outline (character form) of the entire character image.

The character image generating unit 36 is made to generate a character image on the basis of the character form generated by the character form generating unit 35. In this first embodiment, the character image is generated by painting out the inner portion of the outline generated by the character form generating unit 35.

FIG. 2 shows a more concrete configuration of the display system 1*a* according to the first embodiment. As shown in FIG. 2, the display system 1*a* is made up of a character inputting means 11, a calculating means 12, a storage unit 13 and a display unit 2.

The character inputting means 11 is for inputting text data and font information as information (character information) for specifying a character to be displayed on the display unit 2 and, for example, it is composed of a document file 11*a* for storing character information, a keyboard 11*b* and others. This character inputting means 11 is realized with, in addition to various types of devices having an inputting function, such as a keyboard, a mouse, a floppy (registered trademark) and a disk drive in a computer system, an API (Application Program Interface) in an application, such as contents viewer.

The text data inputted through the character inputting means 11 is converted into a character code through an outline data reading unit 12*a*. Moreover, the font information is used for producing a character image from a font and includes at least a type of font, font modification data (thick characters, long characters, and others) and a character size.

The storage unit 13 is composed of a font memory 13*a*, an image memory 13*b* and a data memory 13*c*. The font memory 13*a* is for storing information (outline data, character font) for the formation of a character image of a vector font and a character image and corresponds to various types of storage units such as a hard disk or a memory in a computer system.

In this embodiment, the font memory 13*a* stores, as the font information for the formation of a character image of an outline font, a font size (characteristic image size; for example, 5 points), a type of font (for example, Mincho, Gothic, or the like), font modification data (for example, thick character, long character, or the like) and outline data corresponding to various conditions (font information) such as the presence or absence of font modification, and it functions as the above-mentioned vector font data storing unit 39.

The image memory 13*b* is for carrying out the primary storage of a character image generated by the character image generating unit 36 (character image producing unit 12*d*) or the primary storage of a character image composed of a plurality of characters and corresponds to a memory in a computer system.

The data memory 13*c* is for storing the above-mentioned display unit information and threshold setting information, and functions as the display unit information storing unit 37 and the threshold setting information storing unit 38.

The display unit 2 is made to display a character image developed (stored) in the image memory 13*b* and is controlled (display-controlled) by the calculating means 12.

The calculating means 12 is for making various calculations and corresponds to a CPU (Central Processing Unit) in a computer system. Moreover, as shown in FIG. 2, the calculating means 12 is composed of an outline data reading unit 12*a*, an outline generating method selecting unit 12*b*, a character outline generating unit 12*c* and a character image producing unit 12*d*, and it corresponds to the above-mentioned display control unit 3*a*.

The outline data reading unit 12*a* converts text data into a character code with respect to a character designated by the character inputting means 11 to be displayed on the display unit 2 and, on the basis of this character information (text data, font information), reads out the outline data and character image from the font memory 13*a* through the use of a character code and font information.

The outline generating method selecting unit 12*b* is made to calculate a threshold on the basis of the display unit information and threshold setting information, stored in the storage unit 13, the outline data and others, and calculates a length of each linear element constituting the character outline for selecting a partial base line generating means to be used for the generation of a partial outline of this linear element. It functions as the above-mentioned partial base line length calculating unit 32, threshold calculating unit 33, partial base line generating means 31 and partial base line generating means selecting unit 34.

The character outline generating unit 12*c* is made to generate a partial outline related to each linear element through the use of the partial base line generating means selected by the outline generating method selecting unit 12*b* for generating an outline of that character and functions as the above-mentioned character form generating unit 35.

The character image producing unit 12*d* is made to generate a character image by painting out the inner portion of the outline generated by the character outline generating unit 12*c* and functions as the above-mentioned character image generating unit 36.

Figure 7:
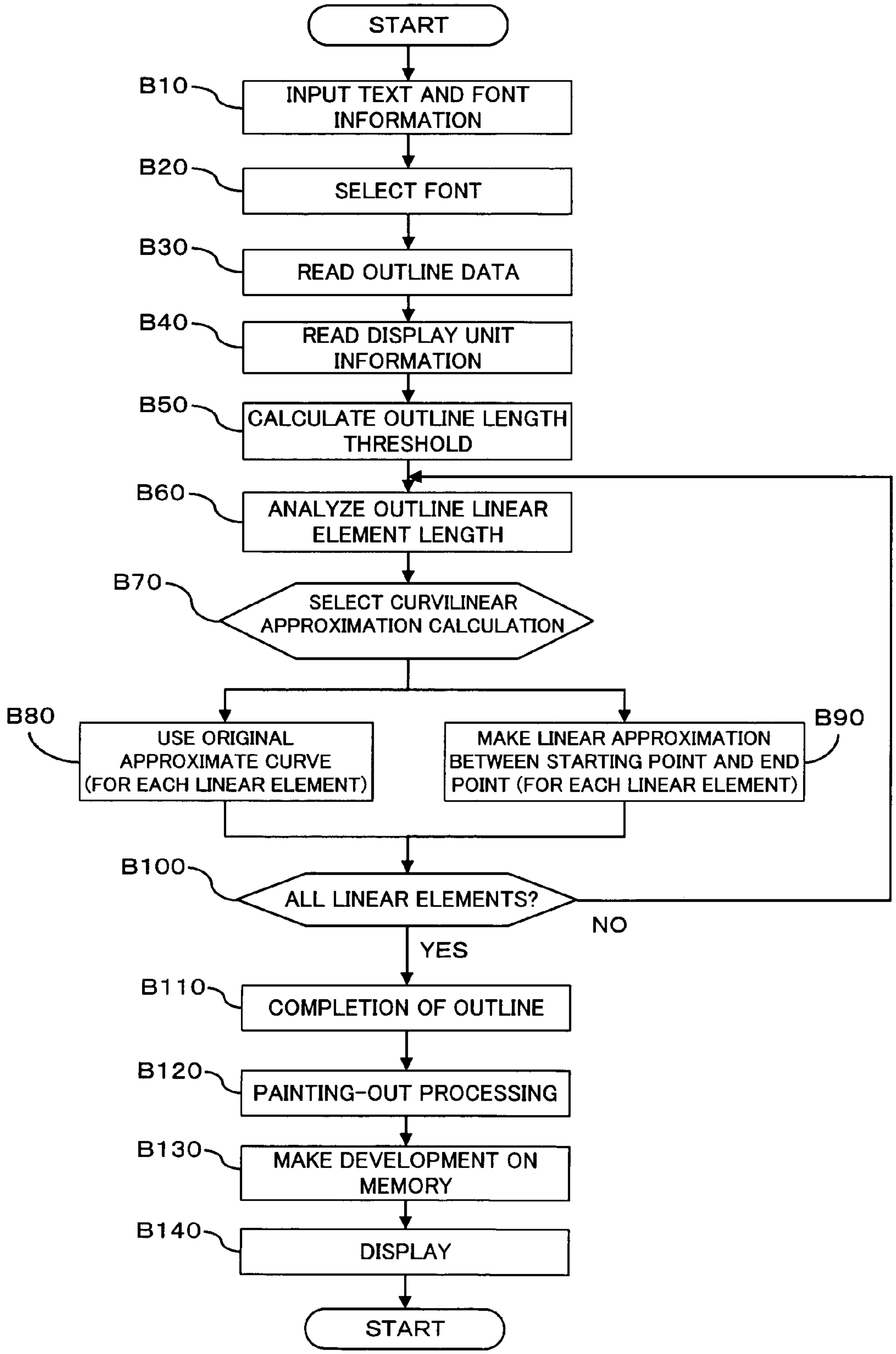
FIG. 7 is a flowchart useful for explaining an outline font character generating method for use in the display system according to the first embodiment of the present invention.
Figure 8:
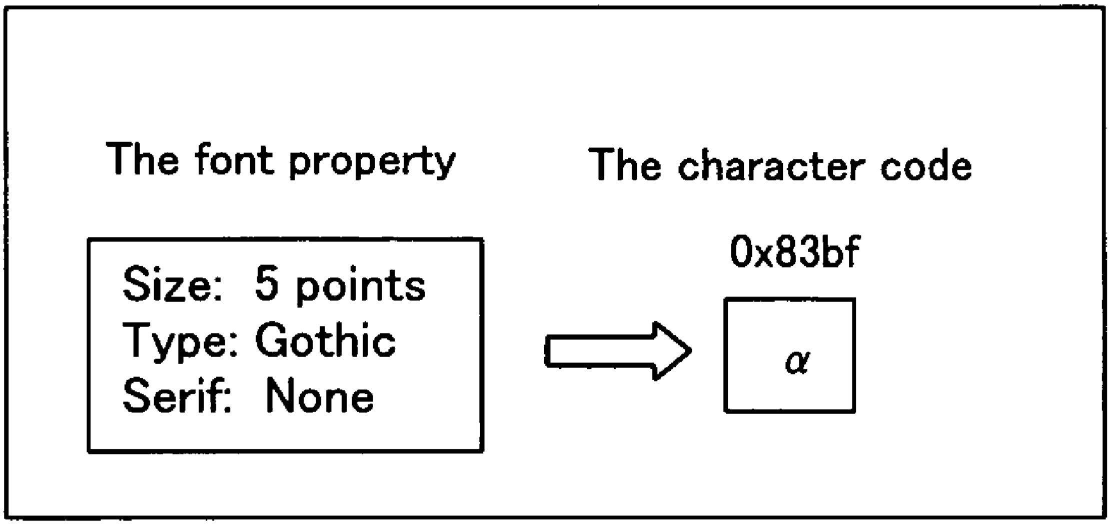
FIG. 8 is an illustration of examples of character information and character code therefor which are inputted to the display system according to the first embodiment of the present invention.
Figure 9:
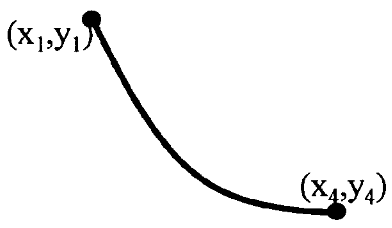
FIG. 9 is an illustration useful for explaining a curvilinear approximation method for use in the display system according to the first embodiment of the present invention.
Figure 10:
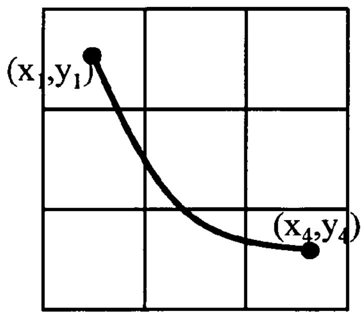
FIG. 10 is an illustration useful for explaining a curvilinear approximation method for use in the display system according to the first embodiment of the present invention.
Figure 11:
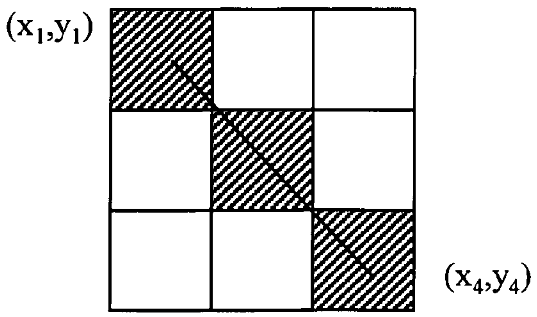
FIG. 11 is an illustration useful for explaining a curvilinear approximation method for use in the display system according to the first embodiment of the present invention.

Referring to FIGS. 8 to 11 and a flow chart (steps B10 to B140) of FIG. 7, a description will be given hereinbelow of an outline font character generating method for use in the display system 1*a* thus constructed according to the first embodiment of the present invention. FIG. 8 is an illustration of an example of character information inputted to the display system 1*a* and a character code thereof, and FIGS. 9 to 11 are illustrations useful for explaining a curvilinear approximation method in this display system 1*a*.

When text data and font information on a character which is an object of display are inputted through the character inputting means 11 (step B10), the outline data reading unit 12*a* produces a character code on the basis of these inputted character information (see FIG. 8). In the example shown in FIG. 8, the font information comprising a font size (size): 5 points, a font type (Type): Gothic and the presence or absence of a serif (Serif); absence (none) and the information comprising a character code (0x83bf) indicative of a character "α" are inputted as the character information.

Moreover, the outline data reading unit 12*a* selects a font to be used for a character image on the basis of the font information (step B20) and reads the outline data from the font memory 13*a* with respect to the selected font (step B30, see FIG. 9).

The outline generating method selecting unit 12*b* (threshold calculating unit 33) reads display unit information on the display unit 2 from the data memory 13*c* (step B40) and, referring to the threshold setting information, calculates a threshold (outline length threshold) on the basis of the display unit information and the font to be used (step B50).

In addition, the outline generating method selecting unit 12*b* (partial base line length calculating unit 32) calculates a linear element length of a linear element of an object of display (analyzes the number of dots) (step B60, see FIG. 10) and makes a comparison between the calculated linear element length and the threshold calculated in the step B50 to select the partial base line generating means 31 (step B70).

The character outline generating unit 12*c* (character form generating unit 35) produces an outline on this linear element according to the comparison/selection result, for example, through the use of the original approximate curve when the linear element length exceeds the threshold (step B80), and produces an outline on this linear element by means of the linear approximation between the starting point of the linear element and the end point thereof when the linear element length is smaller than the threshold (step B90, see FIG. 11).

The character outline generating unit 12*c* confirms whether or not the partial outlines have been produced with respect to all the linear elements constituting the character (step B100) and, if the partial outlines have not been produced with respect to all the linear elements constituting the character (see NO route of step B100), the operational flow returns to the step B60. On the other hand, if the partial outlines have been produced with respect to all the linear elements constituting the character (see YES route of step B100), the production of the outline reaches completion (step B110).

The character image producing unit 12*d* paints out the inner portion of the produced outline to produce a character image (step B120). The character image thus produced is developed in the image memory 13*b* (step B130) and displayed on the display unit 2 (step B140).

In this connection, it is preferable that the character image thus produced is temporarily preserved in the storage unit 13 (font memory 13*a*, image memory 13*b* or the like) and, when the same character is again displayed, the character image temporarily preserved is used for display instead of the re-production of the character image, which enhances the outline font display speed at the re-display.

As described above, in the display system 1*a* according to the first embodiment of the present invention, when the linear element length has a linear element size (for example, below 0.4 to 0.6 mm) so that the difference between a straight line and a curve is not invisible to the human being, an outline is produced through a linear approximation between the starting point of a linear element and an end point thereof, which reduces the load on the CPU 12 at the production of the outline and eliminates the overhead of the curvilinear approximation calculation so as to shorten the outline production time.

Moreover, also in the case of the linear approximation, in the produced outline, the difference (variation of curvature) therebetween is unrecognizable to the visual sensation of the human being and, hence, the linear approximation on a curved linear element becomes feasible without being visible in difference to the human being. That is, the produced outline does not degrade the character quality.

Still moreover, a linear element side (for example, 0.4 to 0.6 mm) which is hardly recognizable in difference between a straight line and a curve to the human being can directly be set as the threshold setting information in the data memory 13*c* (threshold setting information storing unit 38), which provides high convenience.

Yet moreover, the threshold is changed in conjunction with the display screen size of the display unit 2, which enhances the applicability to the display unit 2 to be used.

(B) Description of Second Embodiment

A display system 1*b* according to a second embodiment of the present invention is also provided in an information processing apparatus such as portable telephone or PDA as well as the display system 1*a* according to the first embodiment and is equipped with a display unit 2 and a display control unit 3*b* as shown in FIG. 1.

FIG. 12 is an illustration of threshold setting information to be used for the display system 1*b* according to the second embodiment of the present invention, and is an illustration of an example (threshold setting table) in which threshold setting information is set for each font type (typeface) in the form of a table. In the illustration, the same reference numerals as those used above represent the same or similar parts, and the description thereof will be omitted for brevity.

In the display system 1*b* (see FIGS. 1 and 2) according to the second embodiment of the present invention, the display control unit 3*b* further has a technique of thinning control points in addition to the function of the partial base line generating means 31 of the display control unit 3*a* according to the first embodiment. This control point thinning is such that, for example, the Bezier control points are thinned (rounded) from two points to one point, and it is realizable by taking an average between two points.

In the example of a threshold setting table shown in FIG. 12, two kinds of threshold setting information (threshold setting information 1 and threshold setting information 2) are set in corresponding relation to typeface names, and the threshold setting information 1 is related to the selection of the linear approximation method as well as the threshold setting table shown in FIG. 5. The threshold setting information 2 is related to the selection of the aforesaid control point thinning method.

In the example shown in FIG. 12, with respect to each of linear elements, the control point thinning is made when the linear element length is smaller than the second threshold setting information and equal to or larger than the first threshold setting information, and the linear approximation is made when it is below the first threshold setting information, while an outline of this linear element is produced through the use of the original approximate curve when it is equal to or larger than the second threshold setting information.

For example, in the case of generating a character image based on the Gothic outline font, with respect to each linear element, the control point thinning is made when the linear element length is smaller than 0.75 mm but equal to or larger than 0.5 mm, and the linear approximation is made when it is smaller than 0.5 mm, and an outline of this linear element is produced through the use of the original approximate curve when it is equal to or larger than 0.75 mm.

Figure 13:
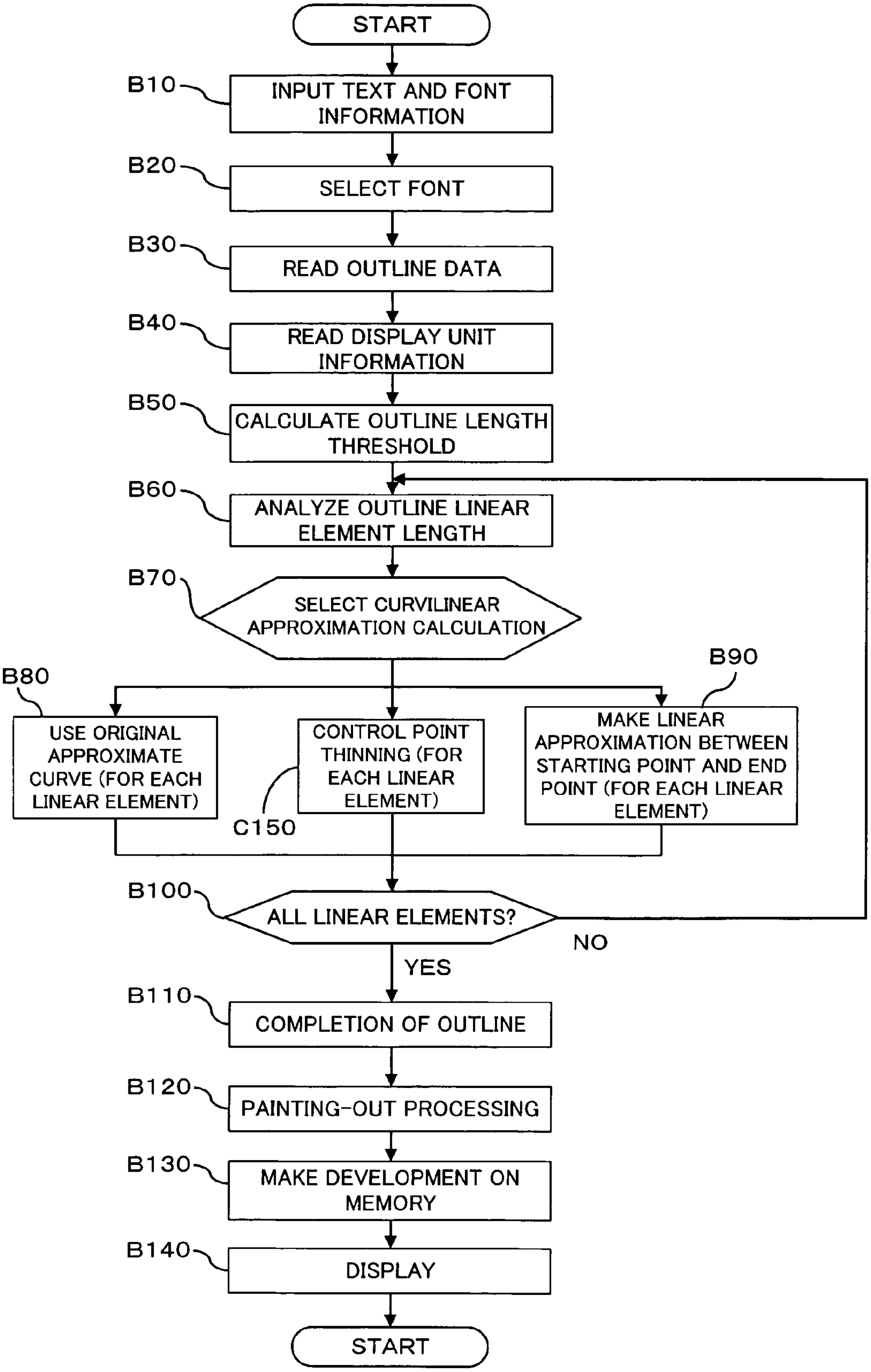
FIG. 13 is a flow chart useful for explaining an outline font character generating method for use in the display system according to the second embodiment of the present invention.

Referring to a flow chart (steps B10 to B140, C150) of FIG. 13, a description will be given hereinbelow of an outline font character generating method in the display system 1*b* according to this second embodiment. The steps marked with the same reference numerals as those used above designate the same or almost same processing/processes, and the detailed description thereof will be omitted for brevity.

According to the comparison/selection result in a step B70, the character outline generating unit 12*c* (character form generating unit 35) carries out the control point thinning when the linear element length is smaller than the threshold setting information 2 but equal to or larger than the threshold setting information 1 (step C150), and carries out the linear approximation when it is smaller than the threshold setting information 1 (step B90), and produces an outline of the relevant linear element through the use of the original approximate curve when it is equal to or larger than the threshold setting information 2 (step B80).

Thus, the display system 1*b* according to the second embodiment of the present invention can provide the effects similar to those of the above-described first embodiment, and further it can select a more optimum partial base line generating means 31 to, for example, a linear element length of each linear element of a curve for the generation of an outline because of the utilization of the linear approximation method and the original approximate curve and the employment of the control point thinning means, which improves the quality of a character image to be displayed on the display unit 2 and shortens the processing time to be taken for the generation of an outline.

Incidentally, although in the second embodiment the partial base line generating means 31 utilizes the linear approximation method and the original approximate curve and further has a means to thin the control points, the present invention is not limited to this, but the partial base line generating means 31 can also employ other methods. For example, it is also appropriate that the approximate curve generation (curvilinear approximation calculation means) using a spline curve (curvilinear approximation function) is prepared in place of the control point thinning method and, with respect to each linear element, the approximation on an approximate curve is made through the spline curve when the linear element length is smaller than the second threshold setting information but equal to or larger than the first threshold setting information while the linear approximation is made when it is smaller than the first threshold setting information and an outline on the relevant linear element is produced through the original approximate curve Bezier curve) when it is equal to or larger than the second threshold setting information.

Thus, in a case in which the original approximate curve is the Bezier curve and the linear element length corresponds to a specified threshold setting information (threshold), the curvilinear approximation is made through the use of a spline curve expressed by an equation having a smaller number of degrees than the Bezier curve which is the original approximate curve, thereby decreasing the number of calculation steps and reducing the load on the CPU 12 needed for the generation of an outline and further shortening the processing time thereof.

(C) Description of Third Embodiment

Figure 14:
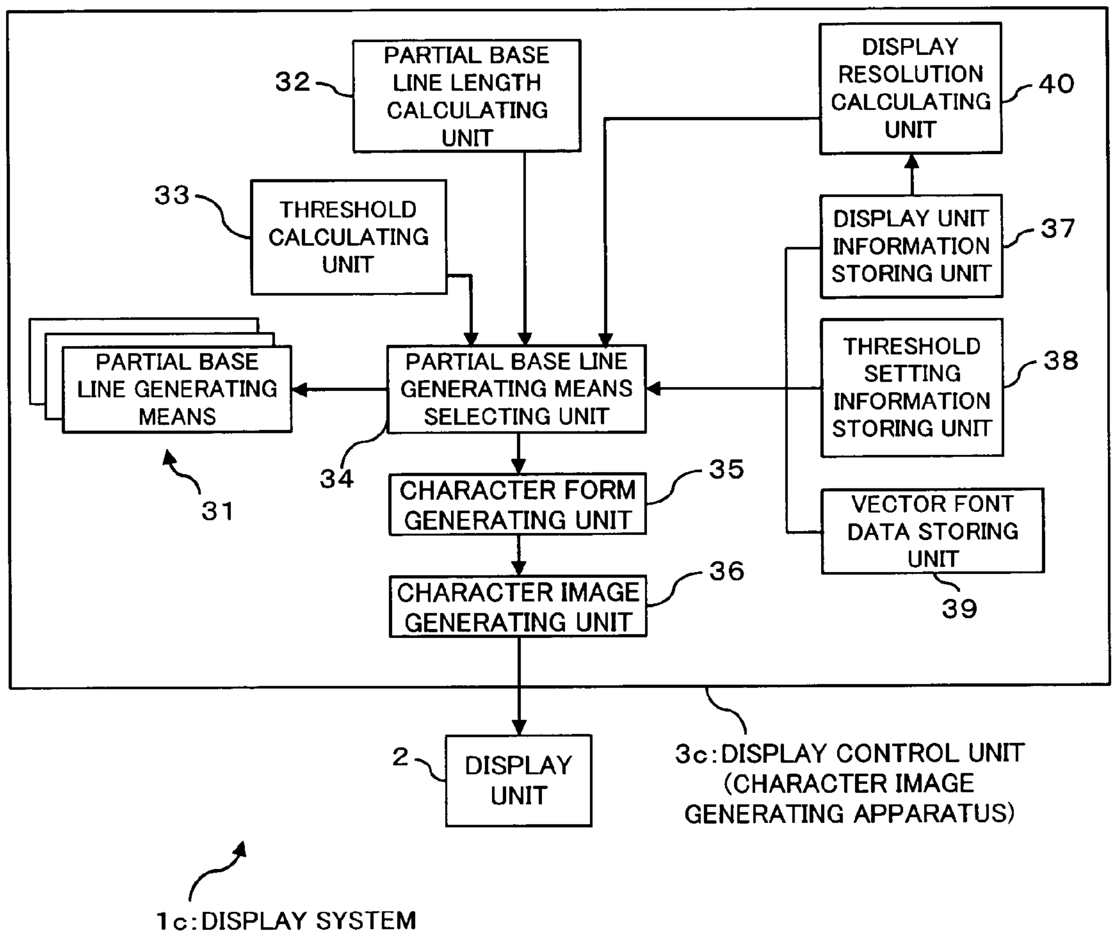
FIG. 14 is a block diagram showing a functional configuration of a display system according to a third embodiment of the present invention.

FIG. 14 is a block diagram showing a functional configuration of a display system 1*c* according to a third embodiment of the present invention.

The display system 1*c* according to the third embodiment of the present invention is also provided in an information processing apparatus such as portable telephone or PDA as well as the display system 1*a* according to the first embodiment and is equipped with a display unit 2 and a display control unit 3*c* as shown in FIG. 14.

Although in the above-described display systems 1*a* and 1*b* according to the first and second embodiments the display resolution of the display unit 2 is stored as the display unit information in the data memory 13*c* (display unit information storing unit 37), in the display system 1*c* according to this third embodiment, in place of the display resolution, the display control unit 3*c* is made to store a display screen size of the display unit 2 and the number of display pixels thereof as the display unit information, and as shown in FIG. 14, it is equipped with a display resolution calculating unit 40.

This display resolution calculating unit 40 is made to calculate the display resolution of the display unit 2 on the basis of the display screen side of the display unit 2 and the number of pixels thereof.

Concretely, the display resolution calculating unit 40 calculates a resolution r on the basis of a display screen size Z (unit; inch) of the display unit 2 and the number N of pixels thereof according to the following equation (4).

$$\text{Resolution } r = N \times 5/N \quad (4)$$

(where image plane ratio=4:3)

Thus, in the display system 1$c$ according to the third embodiment, also in a case in which the display resolution of the display unit is not clear, the display resolution can be calculated on the basis of the display screen size of the display unit 2 and the number of display pixels thereof, which provides high convenience.

Moreover, when the threshold is changed in association with the display screen size of the display unit 2, it is possible to enhance the applicability to the display screen size of the display unit 2.

(D) Description of Fourth Embodiment

Figure 15:
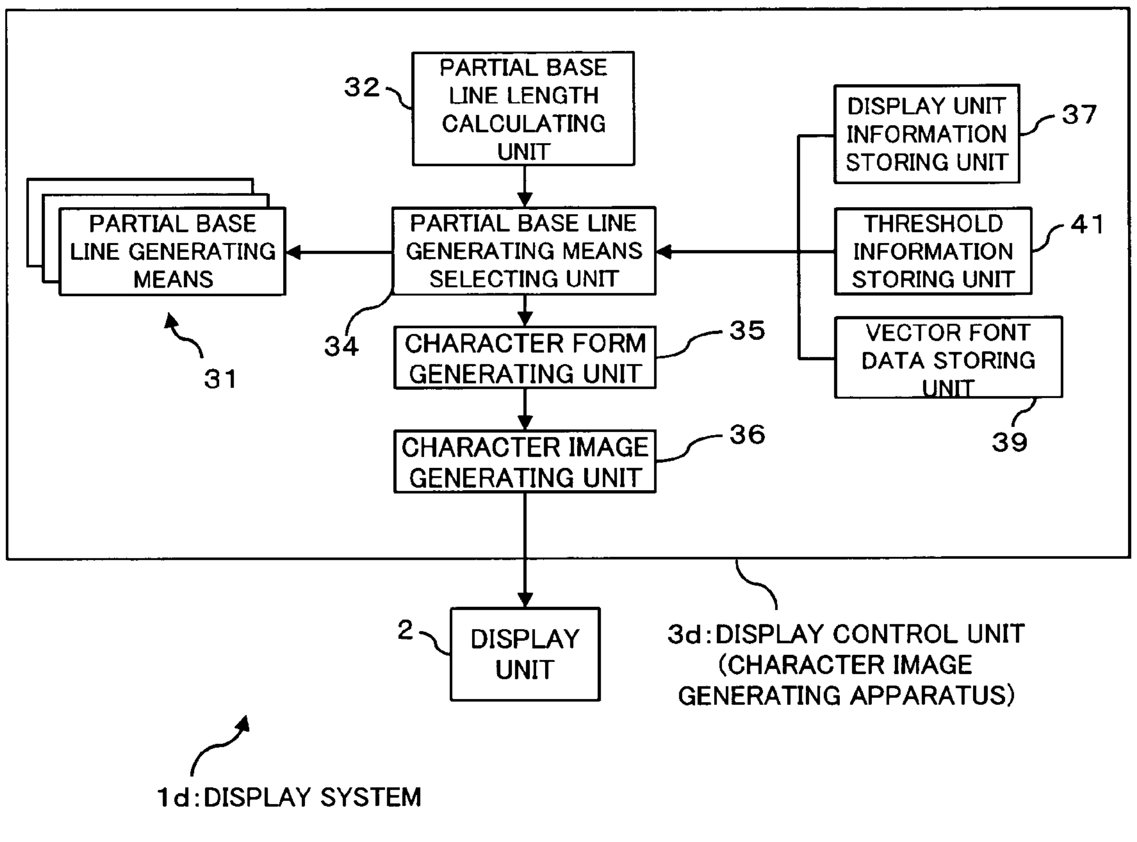
FIG. 15 is a block diagram showing a functional configuration of a display system according to a fourth embodiment of the present invention.
Figure 16:
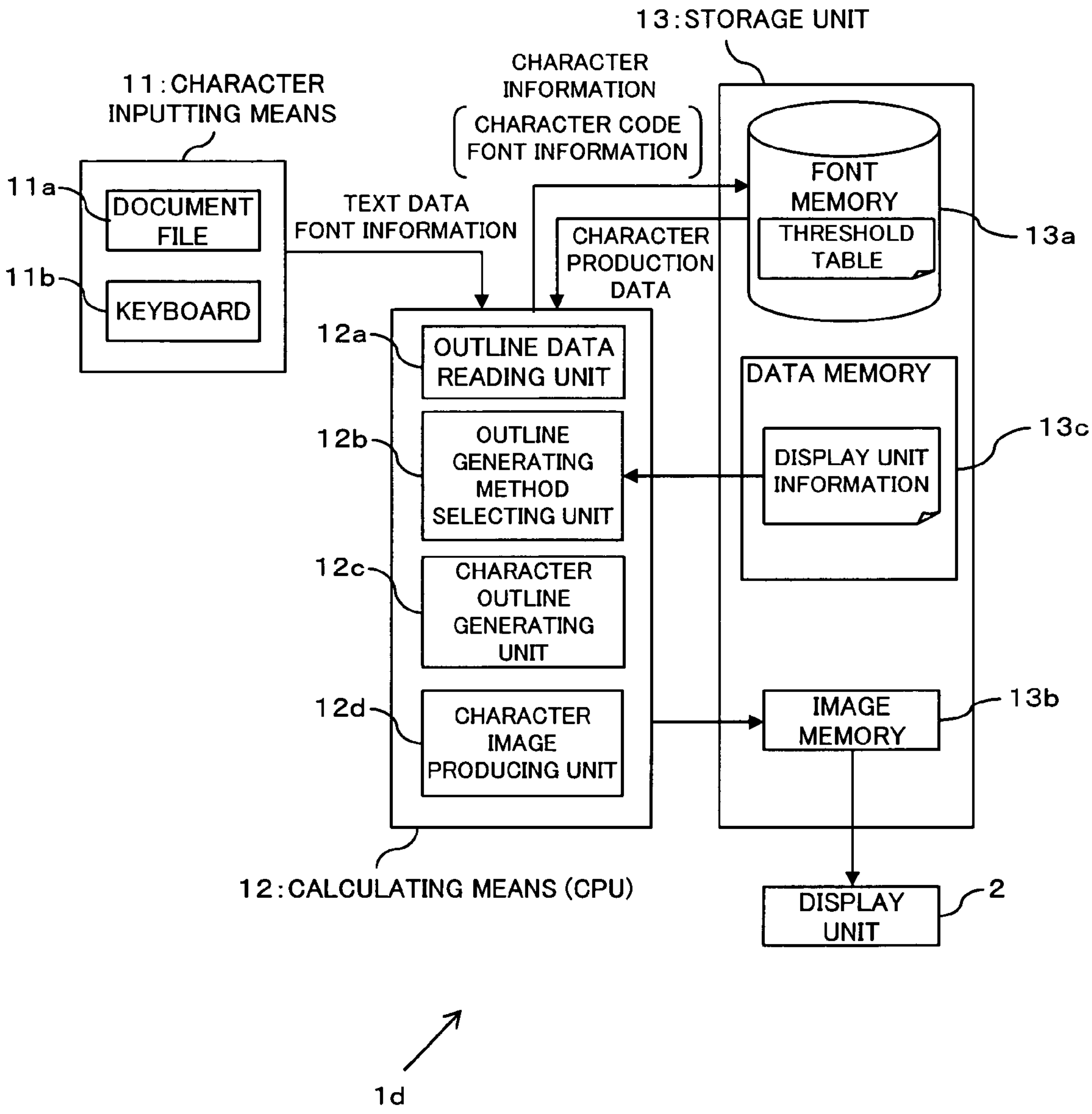
FIG. 16 is a block diagram showing a hardware configuration of the display system according to the fourth embodiment of the present invention.
Figure 17A:
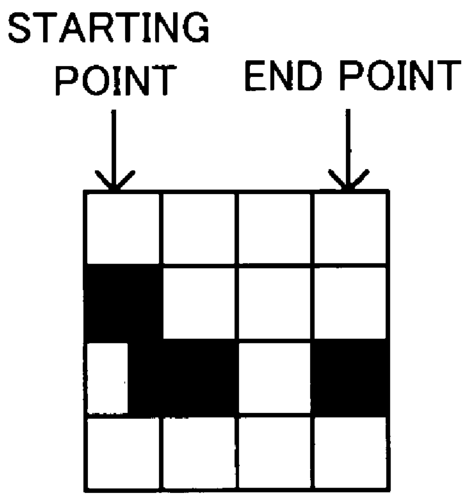
FIGS. 17A, 17B, 17C and 17D are illustrations of examples of pattern images to be used in a display system according to a fifth embodiment of the present invention.
Figure 17B:
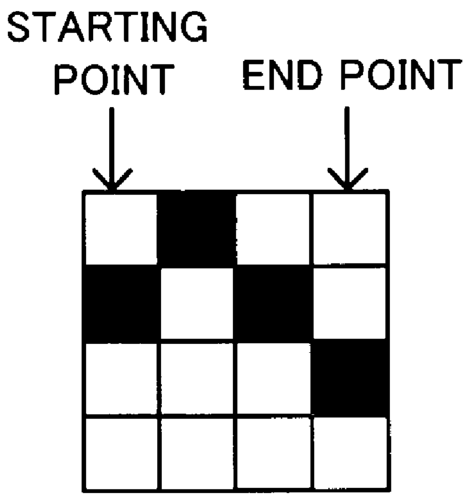
Figure 17C:
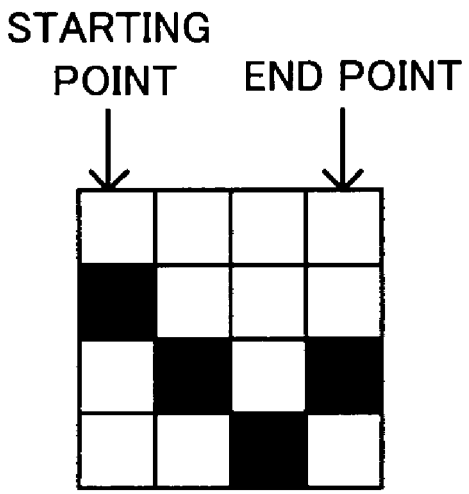
Figure 17D:
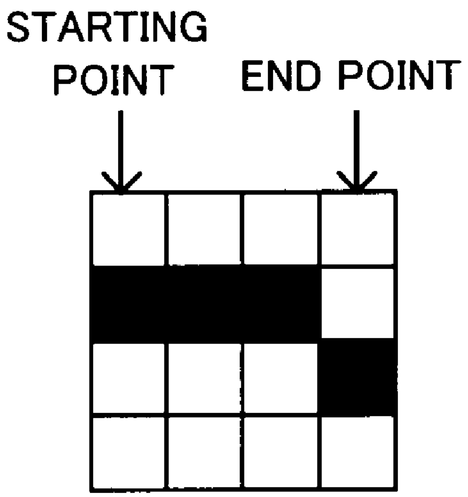

FIGS. 15 and 16 are illustrations of a display system 1$d$ according to a fourth embodiment of the present invention. FIG. 15 is a block diagram showing a functional configuration thereof and FIG. 16 is a block diagram showing a hardware configuration thereof.

The display system id according to the fourth embodiment of the present invention is also provided in an information processing apparatus such as a portable telephone or PDA as well as the display system 1$a$ according to the first embodiment, and is equipped with a display unit 2 and a display control unit 3$d$ as shown in FIG. 15.

In the display system 1$d$ according to the fourth embodiment, as shown in FIG. 15, the display control unit 3$d$ does not include the threshold calculating unit 33 and the threshold setting information storing unit 38 in the display control unit 3$a$ according to the first embodiment, and it includes a threshold storing unit 41. Concretely, as shown in FIG. 16, the threshold setting information stored in the data memory 13$c$ is removed and a threshold table is placed in the font memory 13$a$.

This threshold table (threshold information) is made by associating a previously calculated threshold with a display screen size of the display unit 2 and the number of display pixels thereof. Moreover, in this display system 1$d$ according to the fourth embodiment, the partial base line generating means selecting unit 34 (outline generating method selecting unit 12$b$) sees the threshold table stored in the font memory 13$a$ on the basis of the display screen size and the number of display pixels to acquire the threshold.

This eliminates the need for the calculation of the threshold by the CPU 12, which reduces the load on the CPU 12 needed for the generation of an outline and shortens the processing time therefor.

In addition, when the threshold is changed in association with the pixel size (the number of display pixels) of the display unit 2, it is possible to enhance the applicability to the display unit 2.

(E) Description of Fifth Embodiment

A display system 1$e$ according to a fifth embodiment of the present invention is also provided in an information processing apparatus such as a portable telephone or PDA as well as the display system 1$a$ according to the first embodiment, and is equipped with a display unit 2 and a display control unit 3$e$ as shown in FIG. 1.

FIGS. 17A, 17B, 17C and 17D are illustrations of examples of pattern images to be used in the display system 1$e$ according to the fifth embodiment of the present invention.

In the display system 1$e$ according to this fifth embodiment, the display control unit 3$e$ has a plurality of types of pattern images as shown in FIGS. 17A, 17B, 17C and 17D. These pattern images are a line image made such that, in a matrix area with a predetermined size (in the examples shown in FIGS. 17A, 17B, 17C and 17D, 4 dots×4 dots) corresponding to a dot arrangement on the display screen of the display unit 2, an arbitrary point of a column at one end (left-hand ends in FIGS. 17A, 17B, 17C and 17D) of this matrix is taken as a starting point while an arbitrary point of a column at the other end (right-hand ends in FIGS. 17A, 17B, 17C and 17D) thereof is taken as an end point so that the starting point and the end point are connected through various routes to each other, and they correspond to linear elements constituting an outline (in the following description, they will sometimes be referred to as a linear element pattern image).

Incidentally, the pattern images are not limited to those shown in FIGS. 17A, 17B, 17C and 17D, but various types of patterns different in starting point, end point and control point are also available. Moreover, these pattern images are not limited to matrixes with a size of 4 dots×4 dots shown in FIGS. 17A, 17B, 17C and 17D, but matrixes with various sizes, such as 3 dots×3 dots, 5 dots×5 dots and 5 dots×4 dots, are also available. Still moreover, in use, these matrixes can also be rotated by a predetermined angle, such as 90 degrees, 180 degrees and 270 degrees.

That is, in the display system 1$e$ according to the fifth embodiment, the linear element pattern images shown in FIGS. 17A, 17B, 17C and 17D are prepared in advance, and the partial base line generating means 31 refers to the starting point position (coordinate) of a linear element, the end point position (coordinate) thereof and a control point position (coordinate) thereof to select a pattern image (for example, which agrees in starting point position and end point position and approximates most in control point position) corresponding to the linear element from these pattern images so that the selected pattern image is used as an outline of a portion corresponding to this linear element (pattern image replacing means). These pattern images are preserved in a pattern image memory (not shown) or the like, such as the storage unit 13.

Figure 18:
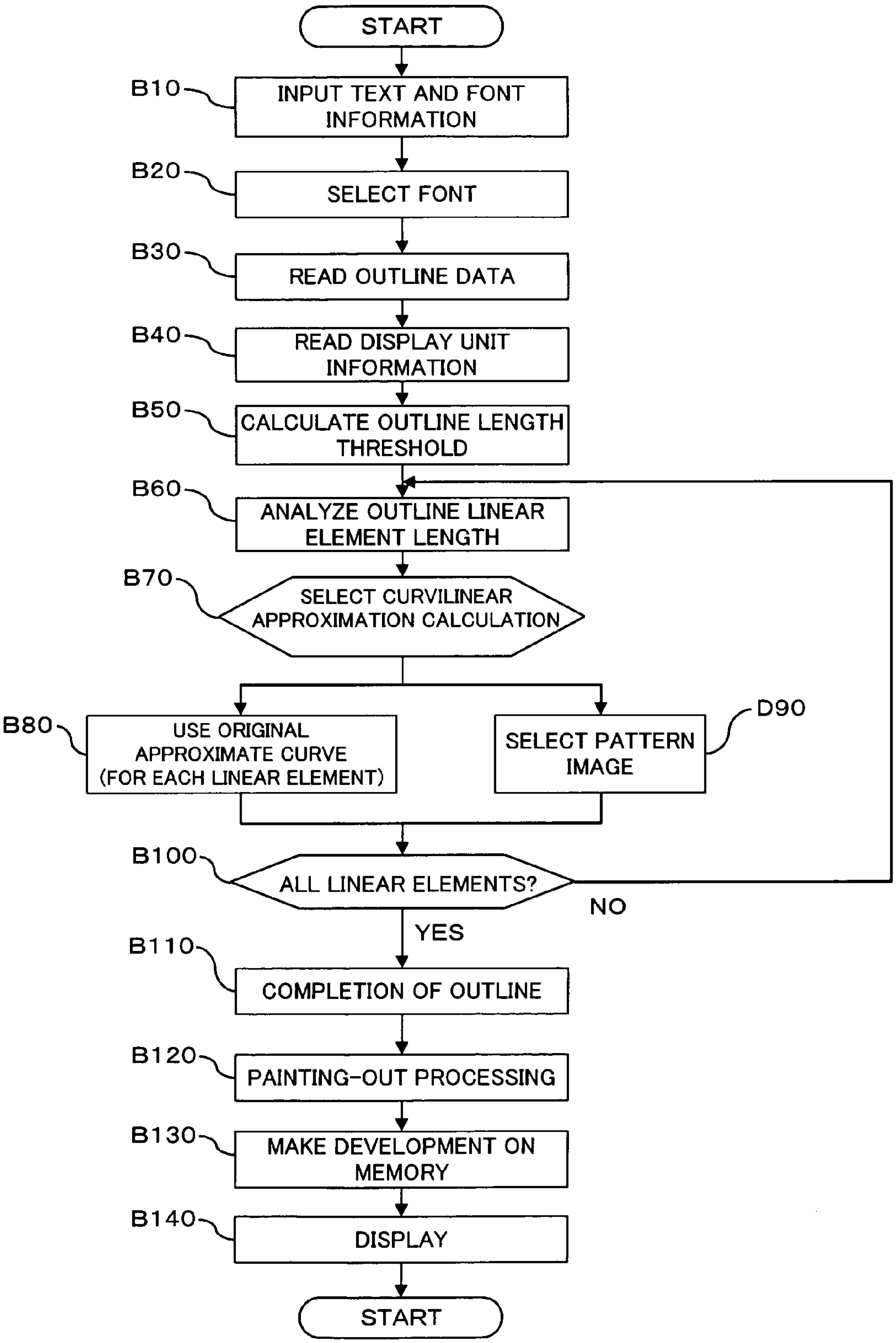
FIG. 18 is a flow chart useful for explaining an outline font character generating method for use in the display system according to the fifth embodiment of the present invention.
Figure 19:
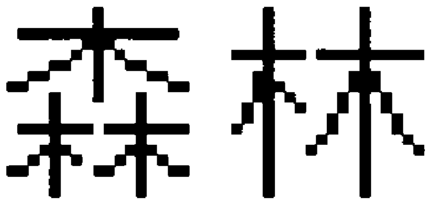
FIG. 19 RELATED ART
FIG. 19 is an illustration of an example of a dot font.
Figure 20:
FIG. 20 RELATED ART
FIG. 20 is an illustration of an example of an outline font.
Figure 21:
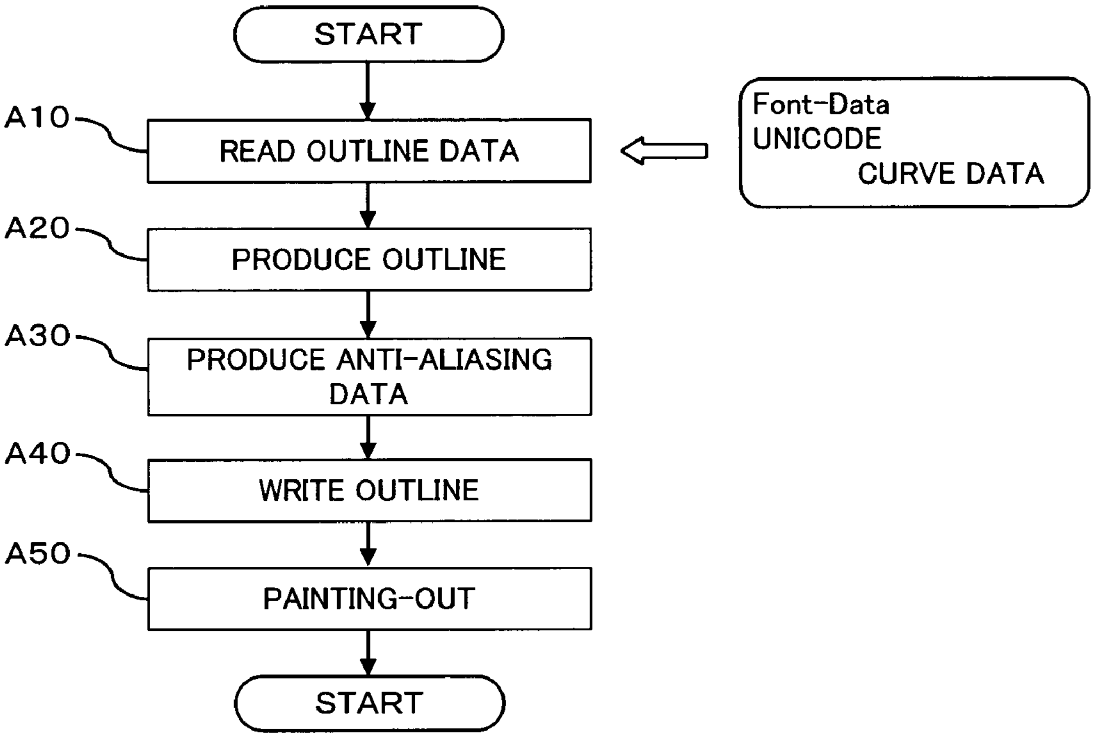
FIG. 21 PRIOR ART
FIG. 21 is a flow chart for explaining a character image generation process based on an outline font.
Figure 22:
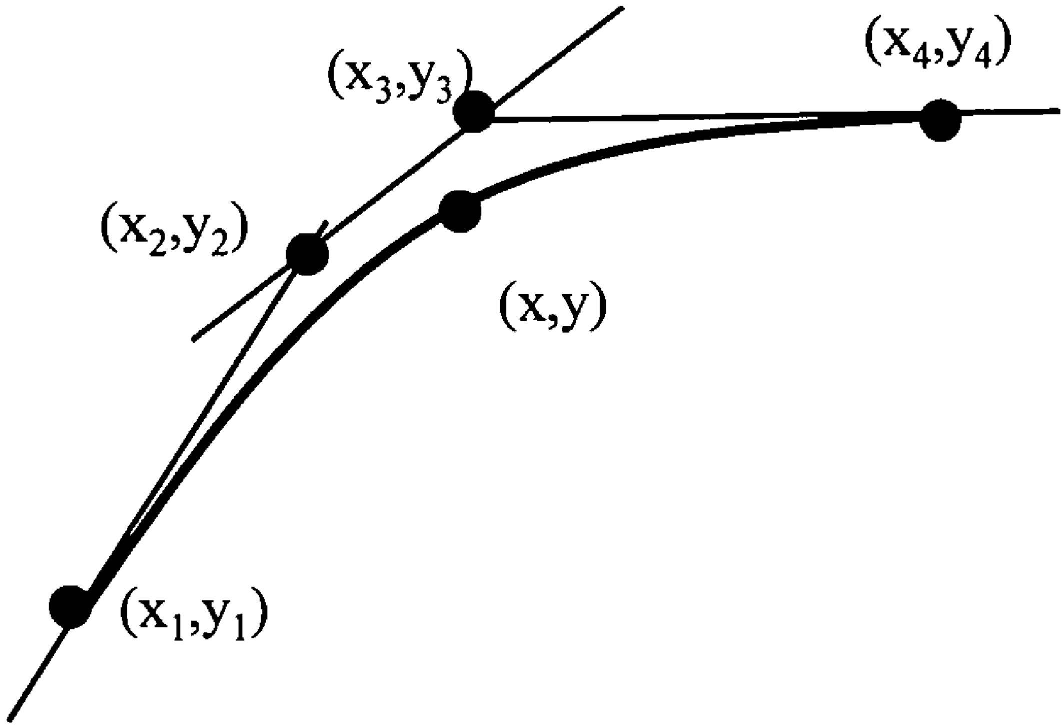
FIG. 22 RELATED ART
FIG. 22 is an illustration of a functional expression of the Bezier curve.
Figure 23:
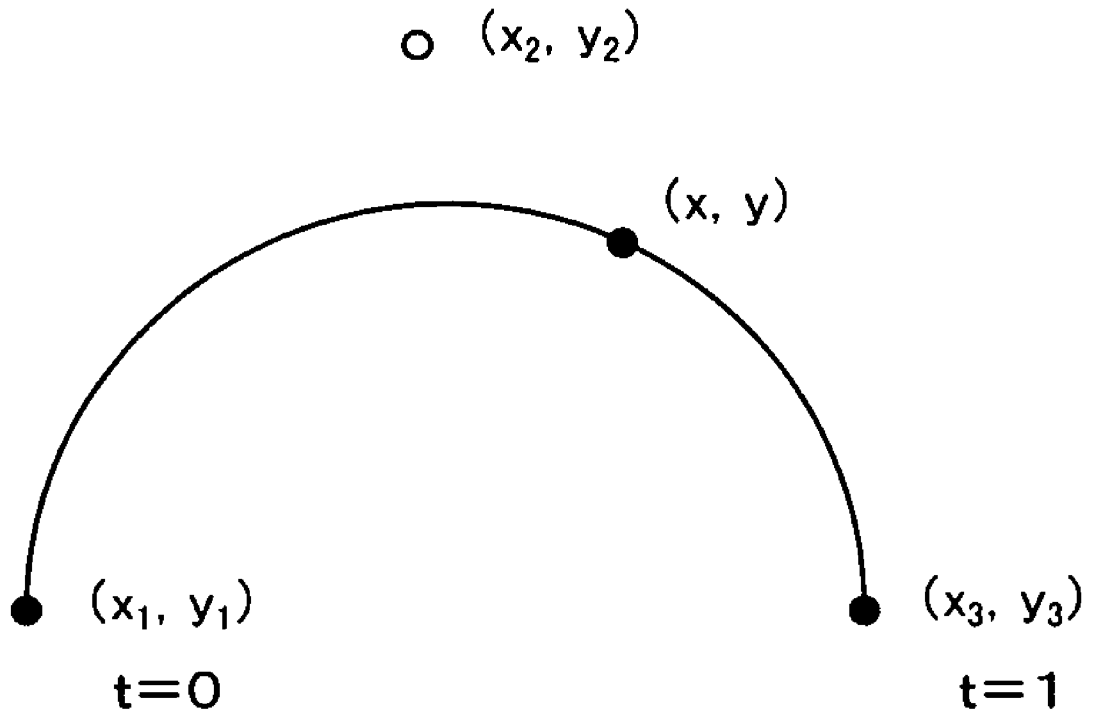
FIG. 23 RELATED ART
FIG. 23 is an illustration of a functional expression of the spline curve.

Referring to a flow chart (steps B10 to B80, D90, B100 to B140) of FIG. 18, a description will be given hereinbelow of an outline font character generating method for use in the display system 1$e$ according to the fifth embodiment. The steps marked with the same reference numerals as those used above designate the same or almost same processing/processes, and the detailed description thereof will be omitted for simplicity.

According to a comparison/section in a step B70, through the use of the pattern image replacing means, the character outline generating unit 12$c$ (character form generating unit 35) selects/acquires a pattern image corresponding to a linear element when the linear element length is smaller than a threshold (threshold setting information to use this pattern image as an outline (step D90). Moreover, an outline corresponding to this linear element is produced through the use of the original approximate curve when the linear element length is equal to or larger than the threshold (threshold setting information) (step B80).

Thus, in the display system 1e according to the fifth embodiment, when the linear element is smaller than the threshold (threshold setting information), a pattern image corresponding to the linear element is selected/acquired through the pattern image replacing means and this pattern image is used as an outline, thereby eliminating the need for the curvilinear approximation calculation or the like to reduce the load on the CPU 12 needed for the generation of an outline and further to shorten the processing time therefor.

The employment of the pattern image enables expressing a constant approximate curve in comparison with the linear approximation.

(F) OTHERS

The CPU of the information processing apparatus executes a display control program or a character image generating program to function as the above-mentioned partial base line generating means 31, partial base line length calculating unit, threshold calculating unit 33, partial base line generating means selecting unit 34, character form generating unit 35, character image generating unit 36, display unit information storing unit 37, threshold setting information storing unit 38, vector font data storing unit 39, outline data reading unit 12a, outline generating method selecting unit 12b, a character outline generating unit 12c, character image producing unit 12d and display resolution calculating unit 40.

The program (display control program and character image generating program) for realizing the functions of the above-mentioned partial base line generating means 31, partial base line length calculating unit, threshold calculating unit 33, partial base line generating means selecting unit 34, character form generating unit 35, character image generating unit 36, display unit information storing unit 37, threshold setting information storing unit 38, vector font data storing unit 39, outline data reading unit 12a, outline generating method selecting unit 12b, a character outline generating unit 12c, character image producing unit 12d and display resolution calculating unit 40 is offered in a state recorded in a computer-readable recording medium such as flexible disk, CD-ROM, CD-R, CD-R/W, DVD, DVD-R, DVD-R/W, magnetic disk, optical disk, magneto optical disk, or the like. Moreover, a computer reads out the program from the recording medium and transfers and stores it into an internal storage unit or an external storage unit before using it. Still moreover, it is also appropriate that the program is recorded in a storage unit (recording medium) such as a magnetic disk, optical disk or magneto optical disk and is supplied from this storage unit through a communication path to a computer.

For realizing the functions of these partial base line generating means 31, partial base line length calculating unit, threshold calculating unit 33, partial base line generating means selecting unit 34, character form generating unit 35, character image generating unit 36, display unit information storing unit 37, threshold setting information storing unit 38, vector font data storing unit 39, outline data reading unit 12a, outline generating method selecting unit 12b, a character outline generating unit 12c, character image producing unit 12d and display resolution calculating unit 40, the program stored in an internal storage unit (in the embodiments, a RAM or ROM of the information processing apparatus) is executed by a microprocessor (in the embodiments, the CPU 12) of the computer. In this case, it is also acceptable that the computer reads out the program recorded in the recording medium and executes it.

In this embodiments, the computer is the concept including a hardware and an operating system and signifies a hardware operating under control of the operating system. Moreover, in a case in which the operating system is unnecessary and a hardware is operated singly by an application program, the hardware itself corresponds to the computer. The hardware includes at least a microprocessor such as a CPU and a means of reading out a computer program recorded in a recording medium and, in the embodiments, the display control units 3a, 3b, 3c, 3d and 3e have a function as the computer.

Furthermore, as the recording medium according to the embodiments, in addition to the above-mentioned flexible disk, CD-ROM, CD-R, CD-R/W, DVD, DVD-R, DVD-R/W, magnetic disk, optical disk and magneto optical disk, it is possible to use various types of computer-readable mediums such as IC card, ROM cartridge, magnetic tape, punch card, internal storage unit (memory including RAM and ROM) of a computer, external storage unit and code printed matters such as bar code.

It should be understood that the present invention is not limited to the above-described embodiments, and that it is intended to cover all changes and modifications of the embodiments of the invention herein which do not constitute departures from the spirit and scope of the invention.

For example, although in the above-described embodiments a character image of an outline font is displayed as an example of a vector font, the present invention is not limited to this, but a character image of a stroke font can also be displayed as the vector font. When the present invention is applied to the stroke font, a skeleton line of a character is used as a character form base line and the skeleton line is composed of a plurality of linear elements.

In addition, although in the above-described embodiments the partial base line generating means selecting unit 34 converts a linear element length calculated in the partial base line length calculating unit 32 and a threshold calculated in the threshold calculating unit 33 into the number of dots for comparison, the present invention is not limited to this, but the comparison can also be made in unit of mm, inch or the like.

The disclosure of each of the embodiments of the present invention enables the present invention to be implemented/manufactured by a person skilled in the art.

What is claimed is:

1. A character image generating apparatus made to generate a character image to be displayed on a display unit on the basis of a vector font for generating the character image through the use of a character form base line formed by combining a plurality of linear elements, comprising:

a plurality of types of partial basic line generating means each for generating a partial base line corresponding to each of said linear elements of said character form base line;

a vector font data storing unit for storing vector font data to be used for the generation of said character image;

a partial base line length calculating unit for calculating a line length of said partial base line of a character which is an object of display on the basis of said vector font data stored in said vector font data storing unit;

a partial base line generating means selecting unit for selecting one of said plurality of types of partial base line generating means on the basis of threshold information set on the basis of a display performance of said display unit and a vision characteristic of the human being and said partial base line length calculated in said partial base line length calculating unit;

a character form generating unit for generating said partial base line corresponding to each of said plurality of linear elements constituting said character form base line through the use of said partial base line generating means selected by said partial base line generating means selecting unit for generating a character form of said character image; and a character image generating unit for generating said character image on the basis of said character form generated by said character form generating unit.

2. The character image generating apparatus according to claim 1, further comprising:

a display unit information storing unit for storing display unit information on a display resolution of said display unit as a display performance of said display unit;

a threshold setting information storing unit for storing threshold setting information indicative of a linear element length invisible in variation of curvature to the human being as said threshold information; and a threshold calculating unit for calculating a threshold on the basis of said display unit information stored in said display unit information storing unit and said threshold setting information stored in said threshold setting information storing unit, said partial base line generating means selecting unit being made to select the one of said plurality of types of partial base line generating means on the basis of said threshold calculated by said threshold calculating unit and said partial base line length calculated by said partial base line length calculating unit.

3. The character image generating apparatus according to claim 2, further comprising a display resolution calculating unit for, when said display unit information is a display screen size of said display unit and the number of pixels thereof, calculating a display resolution of said display unit on the basis of said display screen size and the number of pixels.

4. The character image generating apparatus according to claim 2, wherein at least one of said plurality of types of partial base line generating means is linear approximation calculation means for carrying out linear approximation on a linear element of a curve.

5. The character image generating apparatus according to claim 2, wherein at least one of said plurality of types of partial base line generating means is curvilinear approximation calculation means for carrying out curvilinear approximation on a linear element of a curve.

6. The character image generating apparatus according to claim 1, further comprising a threshold information storing unit for storing said threshold information in a state associated with said display performance of said display unit, with said threshold information being previously calculated on the basis of said display performance of said display unit and a linear element length invisible in variation of curvature to the human being, said partial base line generating means selecting unit selecting the one of said plurality of types of partial base line generating means on the basis of said threshold information stored in said threshold information storing unit and said partial base line length.

7. The character image generating apparatus according to claim 1, wherein at least one of said plurality of types of partial base line generating means is linear approximation calculation means for carrying out linear approximation on a linear element of a curve.

8. The character image generating apparatus according to claim 1, wherein at least one of said plurality of types of partial base line generating means is curvilinear approximation calculation means for carrying out curvilinear approximation on a linear element of a curve.

9. The character image generating apparatus according to claim 8, wherein said plurality of types of partial base line generating means have a plurality of types of curvilinear approximation calculation means different in degree from each other, and said partial base line generating means selecting unit selects a curvilinear approximation calculation means having a lower degree.

10. The character image generating apparatus according to claim 1, wherein a plurality of types of pattern images of said partial base lines corresponding to said linear elements are prepared in a state previously associated with a starting position of said linear element, an end position thereof and a control point position thereof, and one of said plurality of types of partial base line generating means is pattern image replacing means which uses said pattern image as said partial base line, and said character form generating unit generates said partial base line corresponding to said linear element constituting said character form base line through the use of the pattern image equal in starting position and end position and approximate in control point position to said linear element.

11. The character image generating apparatus according to claim 1, wherein said vector font is an outline font and said character form base line is an outline of the character image.

12. The character image generating apparatus according to claim 1, wherein said vector font is a stroke font and said character form base line is a skeleton line of said character image.

13. A character image generating method of generating a character image to be displayed on a display unit on the basis of a vector font for generating the character image through the use of a character form base line formed by combining a plurality of linear elements, comprising:

a partial base line length calculating step of calculating a line length of a partial base line of a character which is an object of display on the basis of vector font data for generating said character image;

a partial base line generating means selecting step of selecting one of a plurality of types of partial base line generating means for generating a partial base line corresponding to said linear element of said character form base line on the basis of threshold information set on the basis of a display performance of said display unit and a vision characteristic of the human being and said partial base line length calculated in said partial base line length calculating step;

a character form generating step of generating said partial base line corresponding to each of said plurality of linear elements constituting said character form base line through the use of said partial base line generating means selected in said partial base line generating means selecting step for generating a character form of said character image; and a character image generating step of generating said character image on the basis of said character form generated in said character form generating step.

14. The character image generating method according to claim 13, further comprising a threshold calculating step of calculating a threshold on the basis of display unit information on a display resolution of said display unit as said display performance of said display unit and threshold setting information indicative of a linear element length invisible in variation of curvature to the human being as said threshold information, in said partial base line generating means selecting step, one of said plurality of types of partial base line generating means being selected on the basis of said threshold calculated in said threshold calculating step and said partial base line length calculated in said partial base line length calculating step.

15. The character image generating method according to claim 14, further comprising a display resolution calculating step of, when said display unit information is a display screen size of said display unit and the number of pixels thereof, calculating a display resolution of said display unit on the basis of said display screen size and the number of pixels.

16. The character image generating method according to claim 13, further comprising a threshold information storing step of storing said threshold information in a state associated with said display performance of said display unit, with said threshold information being previously calculated on the basis of said display performance of said display unit and a linear element length invisible in variation of curvature to the human being, in said partial base line generating means selecting step, one of said plurality of types of partial base line generating means being selected on the basis of said threshold information stored in said threshold information storing step and said partial base line length.

17. A display control apparatus which controls a display of a character image on a display unit on the basis of a vector font for generating said character image through the use of a character form base line formed by combining a plurality of linear elements, comprising:

a plurality of types of partial basic line generating means each for generating a partial base line corresponding to each of said linear elements of said character form base line;

a vector font data storing unit for storing vector font data to be used for the generation of said character image;

a partial base line length calculating unit for calculating a line length of said partial base line of a character which is an object of display on the basis of said vector font data stored in said vector font data storing unit;

a partial base line generating means selecting unit for selecting one of said plurality of types of partial base line generating means on the basis of threshold information set on the basis of a display performance of said display unit and a vision characteristic of the human being and said partial base line length calculated in said partial base line length calculating unit;

a character form generating unit for generating said partial baseline corresponding to said linear element through the use of said partial base line generating means selected by said partial base line generating means selecting unit for generating a character form of said character image;

a character image generating unit for generating said character image on the basis of said character form generated by said character form generating unit; and a display control unit for carrying out control so that said character image generated by said character image generating unit is displayed on said display unit.

18. A display control method of controlling a display of a character image on a display unit on the basis of a vector font for generating said character image through the use of a character form base line formed by combining a plurality of linear elements, comprising:

a vector font data storing step of storing vector font data to be used for the generation of said character image;

a partial base line length calculating step of calculating a line length of said partial base line of a character which is an object of display on the basis of said vector font data stored in said vector font data storing step;

a partial base line generating means selecting step of selecting one of a plurality of types of partial base line generating means, each made to generate a partial base line corresponding to each of said linear elements of said character form base line, on the basis of threshold information set on the basis of a display performance of said display unit and a vision characteristic of the human being and said partial base line length calculated in said partial base line length calculating step;

a character form generating step of generating said partial base line corresponding to each of said plurality of linear elements constituting said character form base line through the use of said partial base line generating means selected by said partial base line generating means selecting step for generating a character form of said character image;

a character image generating step of generating said character image on the basis of said character form generated in said character form generating step; and a display control step of carrying out control so that said character image generated in said character image generating step is displayed on said display unit.

19. A computer-readable recording medium recording a character image generating program which makes a computer carry out a character image generation function to generate a character image to be displayed on a display unit on the basis of a vector font for generating said character image through the use of a character form base line formed by combining a plurality of linear elements, said character image generating program making said computer carry out:

a partial base line length calculating step of calculating a line length of said partial base line of a character which is an object of display on the basis of vector font data for generating said character image;

a partial base line generating means selecting step of selecting one of a plurality of types of partial base line generating means for generating a partial base line corresponding to each of said linear elements of said character form base line on the basis of threshold information set on the basis of a display performance of said display unit and a vision characteristic of the human being and said partial base line length calculated in said partial base line length calculating step;

a character form generating step of generating said partial base line corresponding to each of said plurality of linear elements constituting said character form base line through the use of said partial base line generating means selected in said partial base line generating means selecting step for generating a character form of said character image; and a character image generating step of generating said character image on the basis of said character form generated in said character form generating step.

20. A computer-readable recording medium recording a display control program which makes a computer carry out a display control function to control a display of a character image on a display unit on the basis of a vector font for generating said character image through the use of a character form base line formed by combining a plurality of linear elements, said display control program making said computer carry out:

a vector font data storing step of storing vector font data to be used for the generation of said character image;

a partial base line length calculating step of calculating a line length of said partial base line of a character which is an object of display on the basis of said vector font data stored in said vector font data storing step;

a partial base line generating means selecting step of selecting one of a plurality of types of partial base line generating means, each made to generate a partial base line corresponding to each of said linear elements of said character form base line, on the basis of threshold information set on the basis of a display performance of said display unit and a vision characteristic of the human being and said partial base line length calculated in said partial base line length calculating step;

a character form generating step of generating said partial base line corresponding to each of said plurality of linear elements constituting said character form base line through the use of said partial base line generating means selected in said partial base line generating means selecting step for generating a character form of said character image;

a character image generating step of generating said character image on the basis of said character form generated in said character form generating step; and a display control step of carrying out control so that said character image generated in said character image generating step is displayed on said display unit.

* * * * *

UNITED STATES PATENT AND TRADEMARK OFFICE

CERTIFICATE OF CORRECTION

PATENT NO. : 7,262,774 B2
APPLICATION NO. : 11/063843
DATED : August 28, 2007
INVENTOR(S) : Satoshi Iwata et al.

It is certified that error appears in the above-identified patent and that said Letters Patent is hereby corrected as shown below:

Col. 25, line 61, delete "baseline" and insert --base line-- therefor.

Signed and Sealed this

Fourth Day of March, 2008

JON W. DUDAS
*Director of the United States Patent and Trademark Office*